United States Patent
Seng et al.

(10) Patent No.: US 9,037,782 B2
(45) Date of Patent: May 19, 2015

(54) METHOD OF PROGRAMMING MEMORY CELLS AND READING DATA, MEMORY CONTROLLER AND MEMORY STORAGE APPARATUS USING THE SAME

(75) Inventors: Kian-Fui Seng, Miaoli (TW); Ming-Hui Tseng, Hsinchu (TW); Ching-Hsien Wang, Miaoli County (TW)

(73) Assignee: Phison Electronics Corp., Miaoli (TW)

( * ) Notice: Subject to any disclaimer, the term of this patent is extended or adjusted under 35 U.S.C. 154(b) by 246 days.

(21) Appl. No.: 13/528,840

(22) Filed: Jun. 21, 2012

(65) Prior Publication Data

US 2013/0246732 A1 Sep. 19, 2013

(30) Foreign Application Priority Data

Mar. 14, 2012 (TW) .............................. 101108660 A

(51) Int. Cl.
*G06F 12/00* (2006.01)
*G06F 12/02* (2006.01)
(52) U.S. Cl.
CPC .... *G06F 12/0246* (2013.01); *G06F 2212/7201* (2013.01); *G06F 2212/7209* (2013.01)
(58) Field of Classification Search
None
See application file for complete search history.

(56) References Cited

U.S. PATENT DOCUMENTS

| | | | | |
|---|---|---|---|---|
| 2006/0259715 | A1* | 11/2006 | Getzin et al. | 711/154 |
| 2009/0125668 | A1* | 5/2009 | Huhne | 711/103 |
| 2011/0029723 | A1* | 2/2011 | Lee et al. | 711/103 |
| 2011/0145473 | A1* | 6/2011 | Maheshwari | 711/103 |
| 2011/0283049 | A1* | 11/2011 | Kang et al. | 711/103 |

* cited by examiner

*Primary Examiner* — Matthew Bradley
*Assistant Examiner* — Daniel Tsui
(74) *Attorney, Agent, or Firm* — Jianq Chyun IP Office

(57) ABSTRACT

A method of programming memory cells for a rewritable non-volatile memory module is provided. The method includes: receiving a command which indicates performing an update operation to a logical page; and identifying valid logical access addresses and invalid logical access addresses in the logical page according to the command. The method also includes: selecting a physical page; setting flags corresponding to the valid logical access addresses in a valid state, setting flags corresponding to the invalid logical access in an invalid state; programming the flags and data belonging to the valid logical access addresses to the selected physical page based on the update operation; and mapping the selected physical page to the logical page. Accordingly, the method can effectively increase the speed of programming the memory cells.

22 Claims, 15 Drawing Sheets

METHOD OF PROGRAMMING MEMORY CELLS AND READING DATA, MEMORY CONTROLLER AND MEMORY STORAGE APPARATUS USING THE SAME

CROSS-REFERENCE TO RELATED APPLICATION

This application claims the priority benefit of Taiwan application serial no. 101108660, filed on Mar. 14, 2012. The entirety of the above-mentioned patent application is hereby incorporated by reference herein and made a part of this specification.

BACKGROUND

1. Technology Field

The present invention generally relates to a method of programming memory cells and a method of reading data using flags to increase execution speed, and a memory storage apparatus and a memory controller using the methods.

2. Description of Related Art

The rapid growth in the popularity of digital cameras, cellular phones, and MP3 players in recent years has brought about the escalated demand for storage media by consumers. Since a rewritable non-volatile memory (e.g., a flash memory) has several characteristics, such as non-volatility of data, low power consumption, small size and non-mechanical structure, the rewritable non-volatile memory is the most suitable memory to be adopted in a portable multimedia apparatus mentioned above.

Generally speaking, the rewritable non-volatile memory includes a number of physical blocks, and each of the physical blocks has a number of physical pages. Besides, when writing data to the rewritable non-volatile memory, a physical page is the smallest unit for writing. Thus, when the size of data to be written is smaller than a capacity of the physical page, by the writing method in the related art, predetermined values are programmed with the data to fill up the physical page. When reading data from the rewritable non-volatile memory, these predetermined values are also read. However, under the above-mentioned situation, a controller for controlling the rewritable non-volatile memory has to encode these predetermined values and program these predetermined values to the physical page. Nevertheless, a host system logically identifies logical addresses corresponding to these predetermined values as unused or identifies data stored in these logical addresses as deleted. Thus, programming these predetermined values to the rewritable non-volatile memory is meaningless and gives rise to extra system burden.

Accordingly, how to access data in the size smaller than the storage capacity of one physical page in the rewritable non-volatile memory is an important concern to persons skilled in this field.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a method of programming memory cells, a method of reading data, a memory controller, and a memory storage apparatus, which are capable of increasing the speed of reading and writing data.

According to an exemplary embodiment of the present invention, a method of programming memory cells for a rewritable non-volatile memory module is provided. Herein, the rewritable non-volatile memory module includes a plurality of physical pages, each of physical pages includes a data bit area and a redundancy bit area, the data bit area includes a plurality of physical access addresses, and the redundancy bit area records a plurality of flags corresponding to the physical access addresses, respectively. And, a plurality of logical pages is configured for mapping to a portion of the physical pages, and each of the logical pages has a plurality of logical access addresses. The method of programming memory cells includes: receiving a command for instructing to perform an update operation on a first logical page among the logical pages; identifying invalid logical access addresses and valid logical access addresses among the logical access addresses of the first logical page according to the received command; and selecting a first physical page from the physical pages. The method of programming memory cells further includes: setting flags corresponding to the valid logical access addresses of the first logical page in a valid state; setting flags corresponding to the invalid logical accesses of the first logical page in an invalid state; programming data corresponding to the valid logical access addresses of the first logical page to the data bit area of the first physical page while programming the flags corresponding to the valid logical access addresses of the first logical page and the flags corresponding to the invalid logical access addresses of the first logical page to the redundancy bit area of the first physical page based on the update operation; and mapping the first physical page to the first logical page.

According to another exemplary embodiment of the present invention, a method of reading data for a rewritable non-volatile memory module is provided. The method of reading data includes: receiving a read command for instructing to read data belonging to a second logical access address from a host system; reading data from a third physical access address in the data bit area of a first physical page, wherein the data belonging to the second logical access address is stored in the third physical access address in the data bit area of the first physical page. The method of reading data further includes: determining whether a flag corresponding to the third physical access address in the redundancy bit area of the first physical page is set in an invalid state; if the flag corresponding to the third physical access address in the redundancy bit area of the first physical page is not set in the invalid state, transmitting the data read from the third physical access address in the data bit area of the first physical page to the host system; and if the flag corresponding to the third physical access address in the redundancy bit area of the first physical page is set in the invalid state, transmitting a predetermined value to the host system.

According to still another exemplary embodiment of the present invention, a memory storage apparatus is provided, which includes a connector, a rewritable non-volatile memory module, and a memory controller. Herein, the connector is configured to be coupled to a host system. The memory controller is coupled to the connector and the rewritable non-volatile memory module. Besides, the memory controller is configured to receive a command for instructing to perform an update operation on a first logical page. The memory controller is also configured to identify invalid logical access addresses and valid logical access addresses among the logical access addresses of the first logical page according to such command. The memory controller is further configured to set flags corresponding to the valid logical access addresses of the first logical page in a valid state and set flags corresponding to the invalid logical access addresses of the first logical page in an invalid state. In addition, the memory controller is also configured to program data corresponding to the valid logical access addresses of the first logical page to the data bit area of a first physical page based on the update operation and program the flags corresponding to the valid logical access addresses of the first logical page and the flags corresponding to the invalid logical access addresses of the first logical page to the redundancy bit area of the first physical page. Finally, the memory controller is configured to map the first physical page to the first logical page.

According to yet another exemplary embodiment of the present invention, a memory controller for controlling a rewritable non-volatile memory module is provided. The memory controller includes a host interface, a memory interface and a memory management circuit. Herein, the host interface is configured to couple to a host system. The memory interface is configured to couple to the rewritable non-volatile memory module. The memory management circuit is coupled to the host interface and the memory interface and configured to receive a command instructing to perform an update operation on a first logical page of a plurality of logical pages. Herein, the memory management circuit is configured to identify invalid logical access addresses and valid logical access addresses among the logical access addresses of the first logical page according to the received command. The memory management circuit is also configured to set flags corresponding to the valid logical access addresses of the first logical page in a valid state and set flags corresponding to the invalid logical access addresses of the first logical page in an invalid state. The memory management circuit is further configured to program data corresponding to the valid logical access addresses of the first logical page to a data bit area of the first physical page and program the flags corresponding to the valid logical access addresses of the first logical page and the flags corresponding to the invalid logical access addresses of the first logical page to a redundancy bit area of the first physical page. Additionally, the memory management circuit is configured to map the first physical page to the first logical page.

In light of the foregoing, the method of programming memory cells, and the memory controller and the memory storage apparatus using the same record the flags corresponding to the invalid logical access addresses in the redundancy bit area such that unnecessary write operations can be avoided and the speed of writing data can be increased. In addition, the method of reading data, the memory controller and the memory storage apparatus using the same identify the flags in the redundancy bit area such that unnecessary read operations can be avoided and the speed of reading data can be increased.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
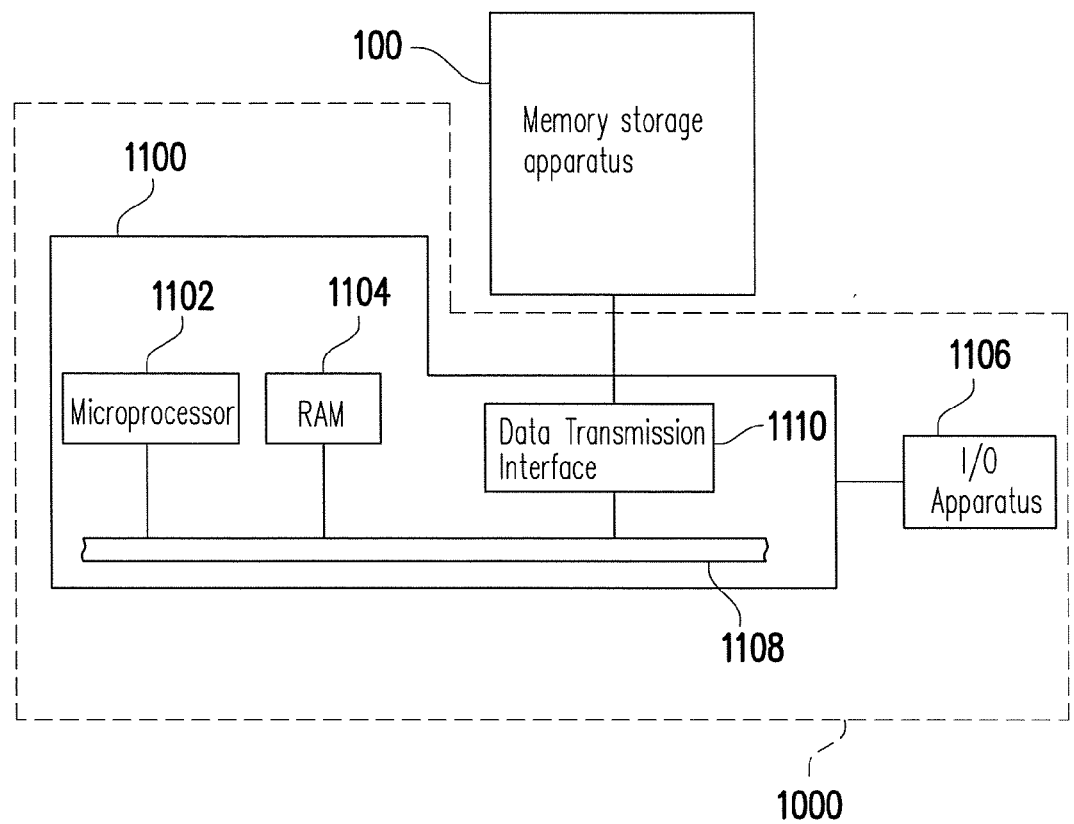
FIG. 1A illustrates a host system and a memory storage apparatus according to a first exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

[First Exemplary Embodiment]

Typically, a memory storage apparatus (i.e., a memory storage system) includes a rewritable non-volatile memory module and a controller (i.e., a control circuit). The memory storage apparatus is usually used together with a host system such that the host system can write data into or read data from the memory storage apparatus.

FIG. 1A illustrates a host system and a memory storage apparatus according to a first exemplary embodiment of the present invention.

Figure 1B:
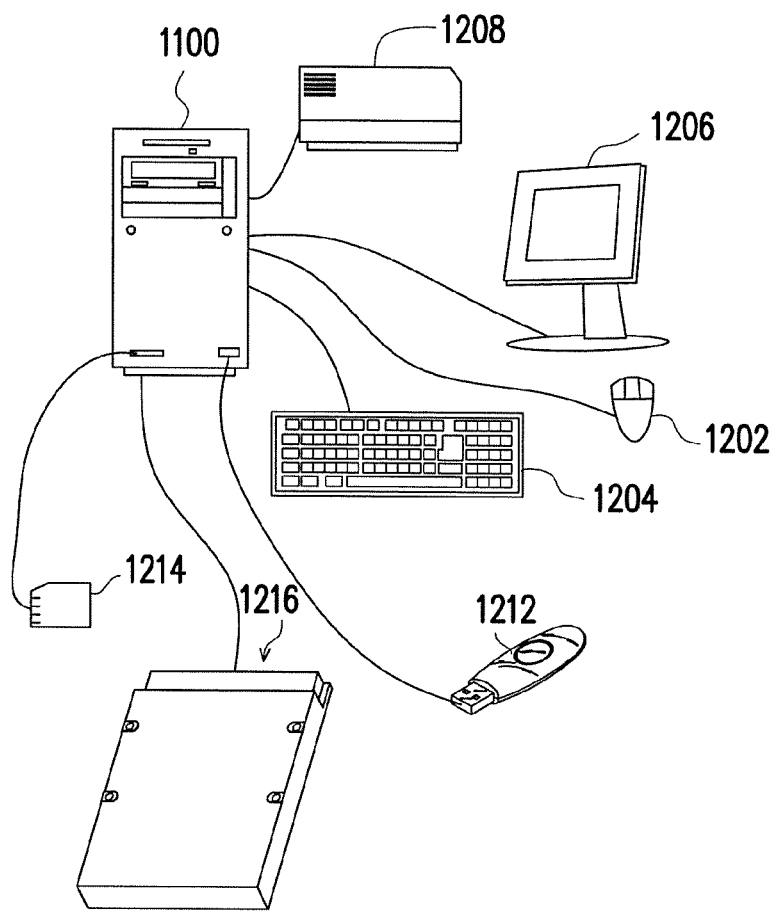
FIG. 1B is a schematic diagram illustrating a computer, an input/output (I/O) apparatus, and a memory storage apparatus according to the first exemplary embodiment of the present invention.

With reference to FIG. 1A, a host system 1000 includes a computer 1100 and an input/output (I/O) apparatus 1106. The computer 1100 includes a microprocessor 1102, a random access memory (RAM) 1104, a system bus 1108, and a data transmission interface 1110. The I/O apparatus 1106 includes a mouse 1202, a keyboard 1204, a display 1206, and a printer 1252, as shown in FIG. 1B. It should be understood that the apparatuses depicted in FIG. 1B should not be construed as limitations to the present disclosure, and the I/O apparatus 1106 may also include other apparatuses.

In an embodiment of the invention, the memory storage apparatus 100 is coupled to other devices of the host system 1000 through data transmission interface 1110. By using the microprocessor 1102, the RAM 1104, and the I/O apparatus 1106, data can be written to or read from the memory storage apparatus 100. For instance, the memory storage apparatus 100 may be a rewritable non-volatile memory storage apparatus, such as a flash drive 1256, a memory card 1214, or a solid state drive (SSD) 1216, as shown in FIG. 1B.

Figure 1C:
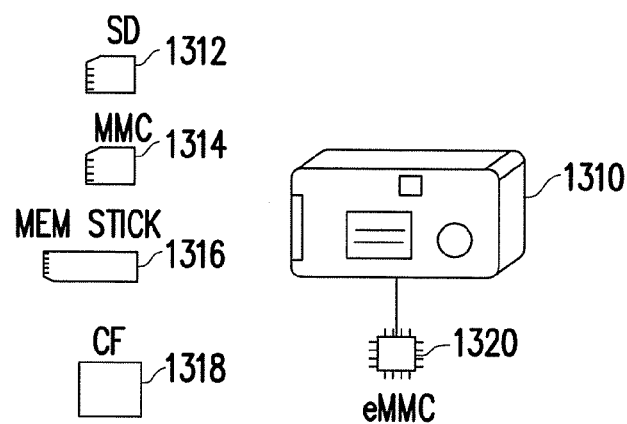
FIG. 1C is a schematic diagram illustrating a host system and a memory storage apparatus according to the first exemplary embodiment of the present invention.

Generally, the host system 1000 can substantially be any system used together with the memory storage apparatus 100 for storing data. Even though the host system 1000 is described as a computer system in the present exemplary embodiment, the host system 1000 in another exemplary embodiment of the invention may be a digital camera, a video camera, a communication apparatus, an audio player, a video player, and so on. For instance, if the host system is a digital camera (video camera) 1310, the rewritable non-volatile memory storage apparatus is an SD card 1312, an MMC card 1314, a memory stick 1316, a CF card 1318 or an embedded storage apparatus 1320 (as shown in FIG. 1C). The embedded storage apparatus 1320 includes an embedded MMC (eMMC). It should be noted that the eMMC is directly coupled to a substrate of the host system.

Figure 2:
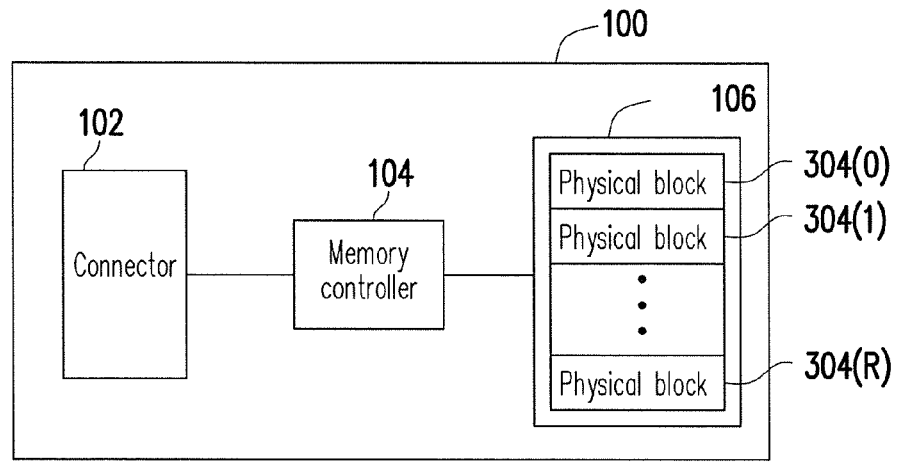
FIG. 2 is a schematic block diagram illustrating the memory storage apparatus depicted in FIG. 1A.

FIG. 2 is a schematic block diagram illustrating the memory storage apparatus depicted in FIG. 1A.

With reference to FIG. 2, the memory storage apparatus 100 includes a connector 102, a memory controller 104, and a rewritable non-volatile memory module 106.

In the present exemplary embodiment, the connector 102 complies with the serial advanced technology attachment (SATA) standard. However, it should be noted that the present invention is not limited thereto, and the connector 102 may comply with the parallel advanced technology attachment (PATA) standard, the Institute of Electrical and Electronic Engineers (IEEE) 1394 standard, the peripheral component interconnect (PCI) express standard, the universal serial bus (USB) standard, the secure digital (SD) standard, the memory stick (MS) standard, the multi media card (MMC) standard, the compact flash (CF) standard, the integrated apparatus electronics (IDE) standard, or other applicable standards.

The memory controller 104 is configured for executing a plurality of logic gates or control commands which are implemented in a hardware form or in a firmware form and performing operations such as data writing, reading or erasing in the rewritable non-volatile memory module 106 according to a command of the host system 1000.

The rewritable non-volatile memory module 106 is coupled to the memory controller 104 and is configured for storing data written by the host system 1000. The rewritable non-volatile memory module 106 has physical blocks 304(0)~304(R). For instance, the physical blocks 304(0)~304(R) can belong to the same memory die or different memory dies. Each of the physical blocks has a plurality of physical pages, and each of the physical pages has at least one physical sector, in which the physical pages belonging to the same physical block can be written independently and have to be erased together. For instance, each of the physical blocks consists of 128 physical pages, and each physical page has 8 physical sectors. Namely, in the example where each of the physical sectors is 512 bytes, the capacity of each physical page is 4 kilobytes. However, it is to be noted that the invention is not limited thereto, and each of the physical blocks may also be constructed by 64, 256, or any other number of physical pages.

In detail, each of the physical blocks is the smallest unit for erasing data. Namely, each of the physical blocks contains the least number of memory cells which are erased all together. Each of physical pages is the smallest unit for programming data. Namely, each of the physical pages is the smallest unit for updating data. However, it should be understood that in another exemplary embodiment, the smallest unit for updating data may be one sector or other size. Each physical page usually includes a data bit area and a redundant bit area. The data bit area is used for storing user data, and the redundant bit area is used for storing system data (e.g., error checking and correcting (ECC) codes).

In the present exemplary embodiment, the rewritable non-volatile memory module 106 is a multi level cell (MLC) NAND flash memory module, and namely, at least 2 bits of data can be stored in a single memory cell thereof. However, the present invention is not limited thereto. The rewritable non-volatile memory module 106 may also be a single level cell (SLC) NAND flash memory module, other flash memory modules or other memory modules with the same property.

Figure 3:
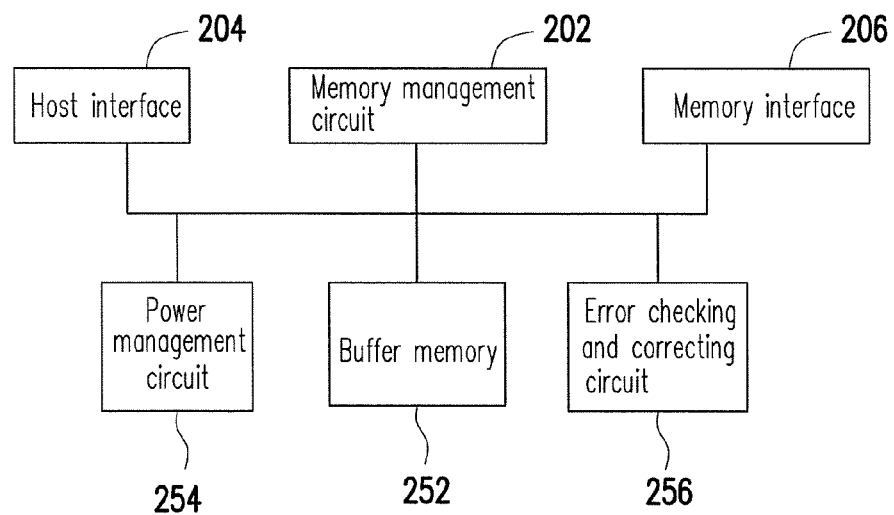
FIG. 3 is a schematic block diagram illustrating a memory controller according to the first exemplary embodiment of the present invention.

FIG. 3 is a schematic block diagram illustrating a memory controller according to the first exemplary embodiment of the present invention.

Referring to FIG. 3, the memory controller 104 includes a memory management circuit 202, a host interface 204 and a memory interface 206.

The memory management circuit 202 is configured for controlling the overall operation of the memory controller 104. Particularly, the memory management circuit 202 has a plurality of control commands, and when the memory storage apparatus 100 is operated, the control commands are executed to perform an operation, such as data writing, data reading and data erasing.

In the present exemplary embodiment, the control commands of the memory management circuit 202 are implemented in a firmware form. For example, the memory management circuit 202 includes a microprocessor unit (not shown) and a read-only memory (ROM, not shown), and the control commands are burnt into the read-only memory.

When the memory storage apparatus 100 is operated, the control commands are executed by the microprocessor unit to perform the operation, such as data writing, data reading and data erasing.

In another exemplary embodiment of the present invention, the control commands of the memory management circuit 202 may also be stored in a specific area (for example, a system area in a memory module dedicated to storing system data) of the rewritable non-volatile memory module 106 in a form of program codes. In addition, the memory management circuit 202 includes a microprocessor unit (not shown), a read-only memory (ROM, not shown) and a random access memory (not shown). Specially, the ROM has boot codes, and when the memory controller 104 is enabled, the microprocessor unit first executes the boot codes to load the control commands stored in the rewritable non-volatile memory module 106 to the RAM of the memory management circuit 202. Then, the microprocessor unit executes the control commands to perform the operation, such as data writing, data reading, and data erasing.

Further, in another exemplary embodiment of the present invention, the control commands in the memory management circuit 202 may also be implemented in a hardware form. For instance, the memory management circuit 202 includes a micro controller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the micro controller. Here, the memory cell management circuit is configured for managing the physical blocks of the rewritable non-volatile memory module 106, the memory writing circuit is configured for giving a write command to the rewritable non-volatile memory module 106 to write data to the rewritable non-volatile memory module 106, the memory reading circuit is configured for giving a read command to the rewritable non-volatile memory module 106 to read data from the rewritable non-volatile memory module 106, the memory erasing circuit is configured for giving an erase command to the rewritable non-volatile memory module 106 to erase data in the rewritable non-volatile memory module 106, and data processing circuit is configured for processing data to be written to the rewritable non-volatile memory module 106 or data read from the rewritable non-volatile memory module 106.

The host interface 204 is coupled to the memory management circuit 202 and configured for receiving and identifying commands and data transmitted from the host system 1000. Namely, the commands and data transmitted from the host system 1000 are transmitted to the memory management circuit 202 through the host interface 204. In the present exemplary embodiment, the host interface 204 complies with the SATA standard. However, it is should be noted that the invention is not limited thereto, and the host interface 204 can also comply with the PATA standard, the IEEE 1394 standard, the PCI Express standard, the USB standard, the SD standard, the MS standard, the MMC standard, the CF standard, the IDE standard, or any other appropriate data transmission standard.

The memory interface 206 is coupled to the memory management circuit 202 and configured to access the rewritable non-volatile memory module 106. In other words, data to be written to the rewritable non-volatile memory module 106 is converted to an acceptable format for the rewritable non-volatile memory module 106 by the memory interface 206.

In an exemplary embodiment of the present invention, the memory controller 104 further includes a buffer memory 252, a power management circuit 254 and an error checking and correcting circuit 256.

The buffer memory 252 is coupled to the memory management circuit 202 and configured for temporarily storing data and commands from the host system 1000 or data from the rewritable non-volatile memory module 106.

The power management circuit 254 is coupled to the memory management circuit 202 and configured for controlling the power of the memory storage apparatus 100.

The error checking and correcting circuit 256 is coupled to the memory management circuit 202 and configured for performing an error checking and correcting procedure to assure the accuracy of data. In particular, when the memory managing 202 receives a write command from the host system 1000, the error checking and correcting circuit 256 generates an error checking and correcting code (ECC code) corresponding to data of the write command, and the memory management circuit 202 writes data corresponding to the write command and the corresponding ECC code to the rewritable non-volatile memory module 106. Afterwards, when reading data from the rewritable non-volatile memory module 106, the memory management circuit 202 also reads the corresponding error checking and correcting code, and the error checking and correcting circuit 256 executes an error checking and correcting procedure on the read data according to the ECC code.

Figure 4:
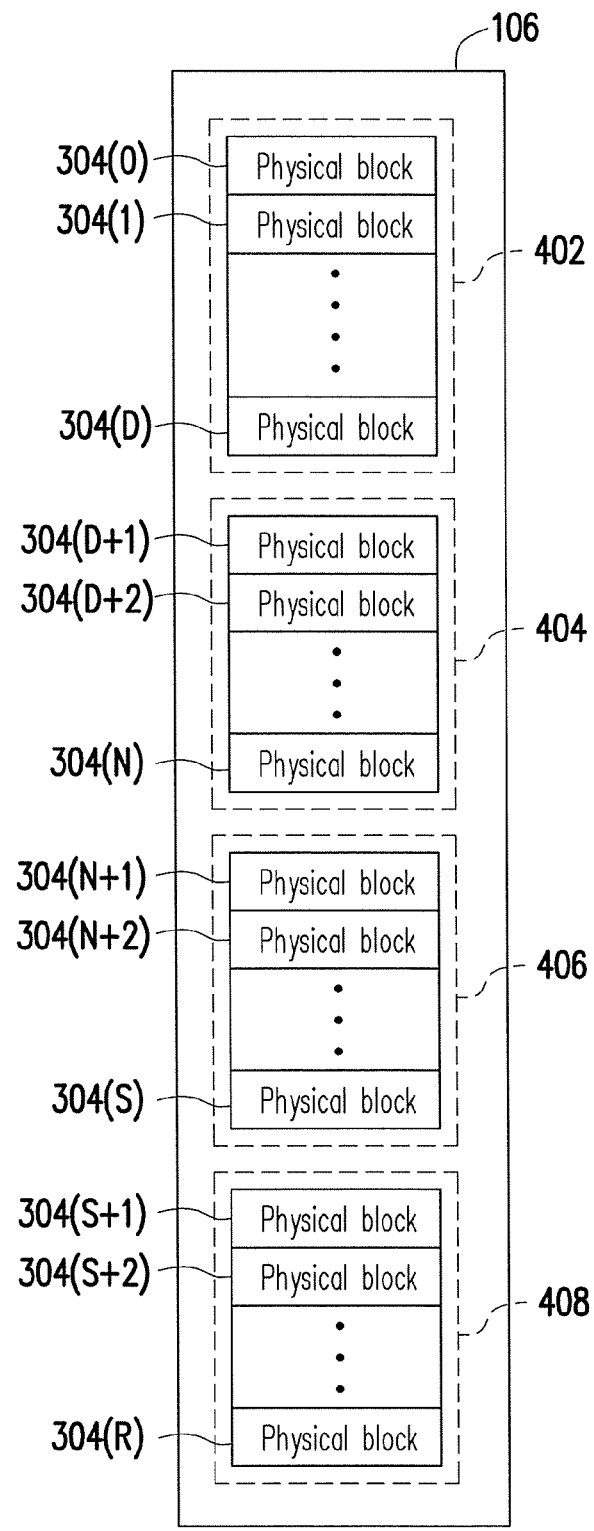
FIG. 4 and FIG. 5 are schematic diagrams illustrating an example of managing a rewritable non-volatile memory module according to the first exemplary embodiment of the present invention.
Figure 5:
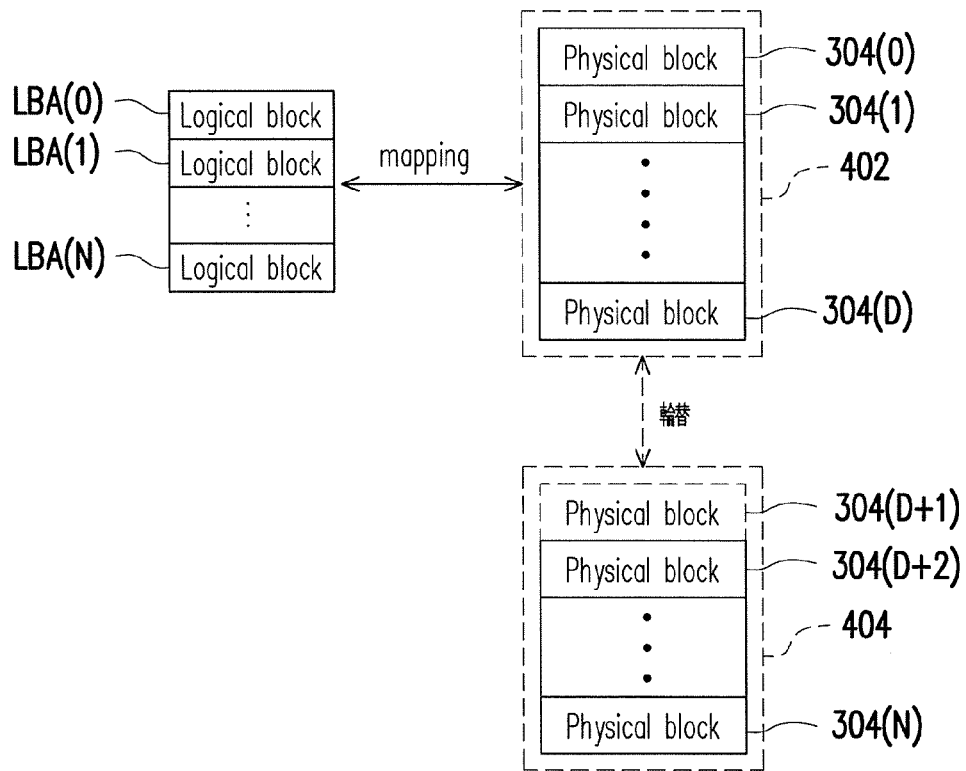

FIG. 4 and FIG. 5 are schematic diagrams illustrating an example of managing a rewritable non-volatile memory module according to the first exemplary embodiment of the invention.

It should be understood that the terms used herein for describing the operations (for example, "get", "select", "replace", "group", and "alternate", etc) performed on the physical blocks of the memory module 106 refer to logical operations performed on these physical blocks. Namely, the actual positions of the physical blocks in the rewritable memory module are not changed, and the physical blocks in the rewritable memory module are only logically operated.

Referring to FIG. 4, the memory controller 104 logically groups the physical blocks 304(0)~304(R) of the rewritable non-volatile memory module 106 to a data area 402, a spare area 404, a system area 406 and a replacement area 408.

The physical blocks of the data area 402 and the spare area 404 are used for storing data from the host system 1000. In particular, the data area 402 are the physical blocks for stored data, and the physical blocks of the spare area 404 are physical blocks for replacing the physical blocks of data area 402. Hence, the physical blocks of the spare area 404 are either blank or available, namely, no data is recorded therein or data recorded therein is marked as invalid data not in use. Namely, an erasing operation has been performed on the physical blocks of the spare area 404, or when a physical block of the spare area 404 is gotten for storing data, the erasing operation is performed on the gotten physical block. Hence, the physical blocks of the spare area 404 are available physical blocks.

The physical blocks logically belonging to the system area 406 are configured for recording system data. The system data includes information related to the manufacturer and a model of the memory module, the number of the physical blocks of a memory chip and the number of the physical pages in each memory block and so forth.

Logically, the physical blocks belonging to the replacement area 408 are replacement physical blocks. For example, when the rewritable non-volatile memory module 106 is manufactured in the factory, 4% of the physical blocks thereof are reserved for replacement. Namely, when any physical block in the data area 402, the spare area 404, and the system area 406 is damaged, a physical block in the replacement area 408 is used for replacing the damaged physical block, i.e. the bad block. Thus, if there are still normal physical blocks in the replacement area 408, and a physical block is damaged, the memory controller 104 gets a normal physical block from the replacement area 408 for replacing the damaged physical block. If there are no more normal physical blocks in the replacement area 408, and a physical block is damaged, the memory controller 104 declares that the whole memory storage apparatus 100 is in a write-protect status, and no more data is allowed to be written therein.

In particular, the numbers of physical blocks in the data area 402, the spare area 404, the system area 406 and the replacement area 408 are various based on different memory specification. Additionally, it should be understood that the grouping relationships of grouping the physical blocks to data area 402, the spare area 404, the system area 406 and the replacement area 408 are dynamically changed during the operation of the memory storage apparatus 100. For example, when a physical block of the spare area 404 is damaged and replaced by a physical block of the replacement area, the physical block initially located at the replacement area is associated with the spare area.

Referring to FIG. 5, as described above, the physical blocks in the data area 402 and the spare area 404 are alternated to store data written by the host system 1000. In the present exemplary embodiment, the memory controller 104 configures logical blocks LBA(0)~LBA(N) for the host system 1000 to properly access data in the physical blocks that store data with the above-mentioned alternate manner. Particularly, when the memory storage apparatus 100 is formatted by an operation system 1110 with a file system (e.g., FAT 32), the logical blocks LBA(0)~LBA(N) are respectively mapped to the physical blocks 304(0)~304(D) of the data area 402. That is, a logical block is mapped to a physical block in the data area 402. Here, a logical block-physical block mapping table is created by the memory management circuit 202 for recording the mapping relationship between the logical blocks and the physical blocks.

Figure 6:
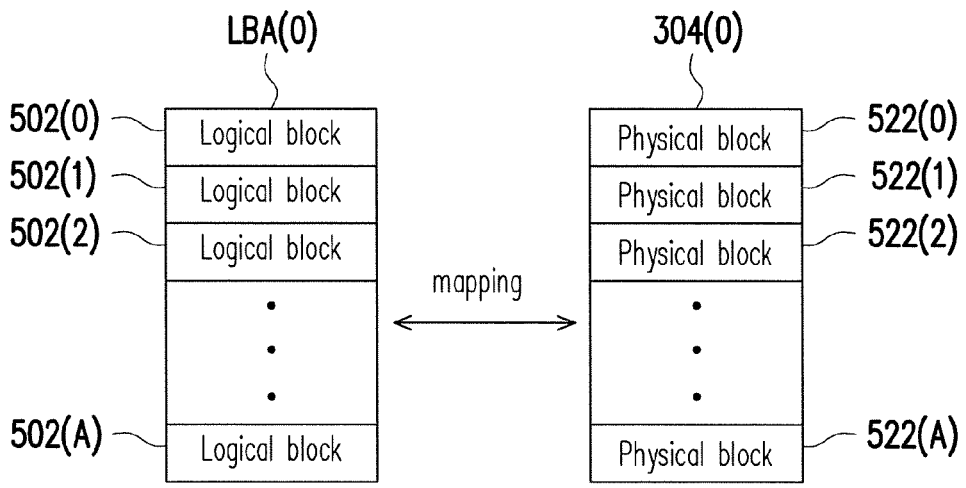
FIG. 6 is a diagram of mapping logical blocks to physical blocks according to the first exemplary embodiment of the present invention.

FIG. 6 is a diagram of mapping logical blocks to physical blocks according to the first exemplary embodiment of the invention.

Referring to FIG. 6, a logical block includes a plurality of logical pages, and the logical pages are mapped to the physical pages of each physical block in the data area 402. For example, the logical pages 502(0)~502(A) of the logical block LBA(0) are mapped to physical pages 522(0)~522(A) of the physical block 304(0).

In the present exemplary embodiment, each physical page includes a data bit area and a redundancy bit area. The data bit area is used for storing user data, and the redundancy bit area is used for storing system data (e.g. the ECC code). In the present exemplary embodiment, the data bit area includes a plurality of physical access addresses. On the other hand, a logical page includes a plurality of logical access addresses, and the logical access addresses are mapped to the physical access addresses in the data bit area. Namely, the number of the logical access addresses in one logical page is equal to the number of the physical access addresses in one physical page. In the present exemplary embodiment, the data bit area in each physical page includes 4 physical access addresses, and the size of each physical access address is the size of one physical sector. However, in other exemplary embodiments, the data bit area may include a larger or a smaller number of physical access addresses, and the invention is not intent to limit to the size and the number of the physical access addresses.

Figure 7:
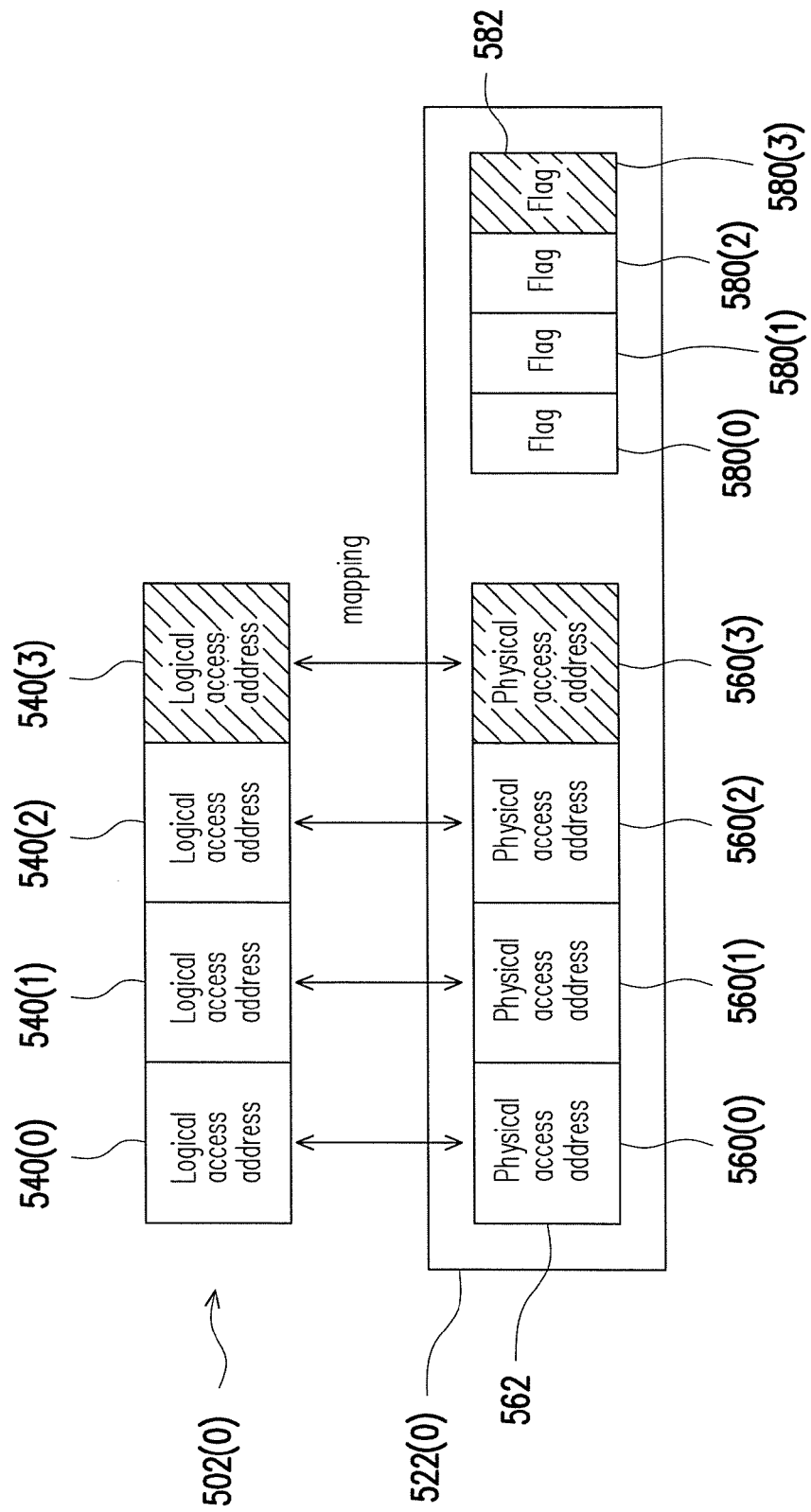
FIG. 7 is a diagram of mapping a logical page to a physical page according to the first exemplary embodiment of the present invention.

FIG. 7 is a diagram of mapping a logical page to a physical page according to the first exemplary embodiment of the present invention. The way for mapping each physical page to each logical page is similar, and here, the physical page 522(0) and the logical page 502(0) are illustrated as an example for description. The way for mapping the other physical pages to the other logical pages is analogized likewise.

Referring to FIG. 7, the physical page 522(0) includes a data bit area 562 and a redundancy bit area 582. The data bit area 562 includes physical access addresses 560(0)~560(3). The logical page 502(0) includes logical access addresses 540(0)~540(3), and each of the logical access addresses 540(0)~540(3) are mapped to each of the physical access addresses 560(0)~560(3) of the physical page 522(0).

It should be noted that, in the present exemplary embodiment, the redundancy bit area of each physical page records a plurality of flags, and the flags correspond to physical access addresses in the data bit area. For example, the redundancy bit area records flags 580(0)~580(3), respectively correspond to the physical access addresses 560(0)~560(3). For example, the flag 580(0) corresponds to the physical access address 560(0), the flag 580(1) corresponds to the physical access address 560(1), the flag 580(2) corresponds to the physical access address 560(2), and the flag 580(3) corresponds to the physical access address 560(3).

In the present exemplary embodiment of the present invention, the flags recorded in the redundancy bit area are set in a valid state or in an invalid state and configured for identifying whether a logical access address mapped to the corresponding physical access address is in a free state. For example, in the present exemplary embodiment, if the flag 580(3) is set in the invalid state, it indicates that the logical access address 540(3) mapped to the physical access address 560(3) is in the free state. Here, the logical access addresses in the free state are referred to as logical access addresses where no data is written, or logical access address where stored data is deleted. When no data is written to the logical access address 540(3) is deleted, or data stored in the logical access address 540(3), it indicates that the host system 1000 logically identifies the logical access address 540(3) as storing no data. Namely, for the host system 1000, the logical access address 540(3) is a free logical access address not in use, and when the free logical access address is read, a predetermined value belonging to a specific pattern should be received. For example, the predetermined value is a character string with all "0" or a character string with all "1", but the present invention is not limited thereto.

In other words, in the example where the logical access address 540(3) is in the free state, when the host system 1000 is about to read the logical access address 540(3), the predetermined value is read by the host system 1000, instead of data stored in the physical access address 560(3) mapped to the logical access address 540(3). Particularly, when the host system 1000 is about to read a logical access address (i.e. a second logical access address), the host system 1000 transmits a read command to the memory storage apparatus 100. For example, the host system 1000 sets the read command as to read the second logical access address 540(3) and transmits the read command to the memory management circuit 202. Then, when receiving the read command, the memory management circuit 202 obtains a mapping relationship for the second logical access address (i.e. the logical access address 540(3) is mapped to the physical access address 560(3) in the physical page 522(0)). Afterwards, the memory management circuit 202 reads stored data from the physical access address 560(3) (i.e. a third physical access address). Specially, the memory management circuit 202 determines whether the flag 580(3) corresponding to the physical access address 560(3) is set in the valid state or in the invalid state. If the flag 580(3) is set in the valid state, the memory management circuit 202 transmits data read from the physical access address 560(3) to the host system 1000. On the other hand, if the flag 580(3) is set in the invalid state, the memory management circuit 202 transmits the predetermined value to the host system 1000. In other words, under the condition where the flag 580(3) is set in the invalid state, the memory management circuit 202 identifies whether the logical access address 540(3) is one address where no data is written or one address where stored data is deleted. Accordingly, the memory management circuit 202 directly returns the predetermined value to the host system 100 in response to the read command.

It is to be mentioned that one read command given by the host system 1000 may instruct to read a plurality of logical pages or read a plurality of logical access addresses in a logical page. In this example, the memory management circuit 202 checks a plurality of corresponding flags according to the received read command and, based on the flags in the valid state or in the invalid state, determines to return the predetermined value or transmit data read from the corresponding physical access addresses to the host system 100 in response to the read command. The present invention is not intent to limit the number of logical access addresses to be read as instructed by the read command.

In the present exemplary embodiment, each of the flags is indicated by one bit. The bit of "1" indicates the flag in the invalid state, and the bit of "0" indicates the flag in the valid state. Alternatively, "0" may also indicate the invalid state, and "1" may also indicate the valid state. However, each flag may be indicated by other number of bits. The invention is not intent to limit bit number for indicating the flag and the manner indicating the valid state and the invalid state.

Figure 8:
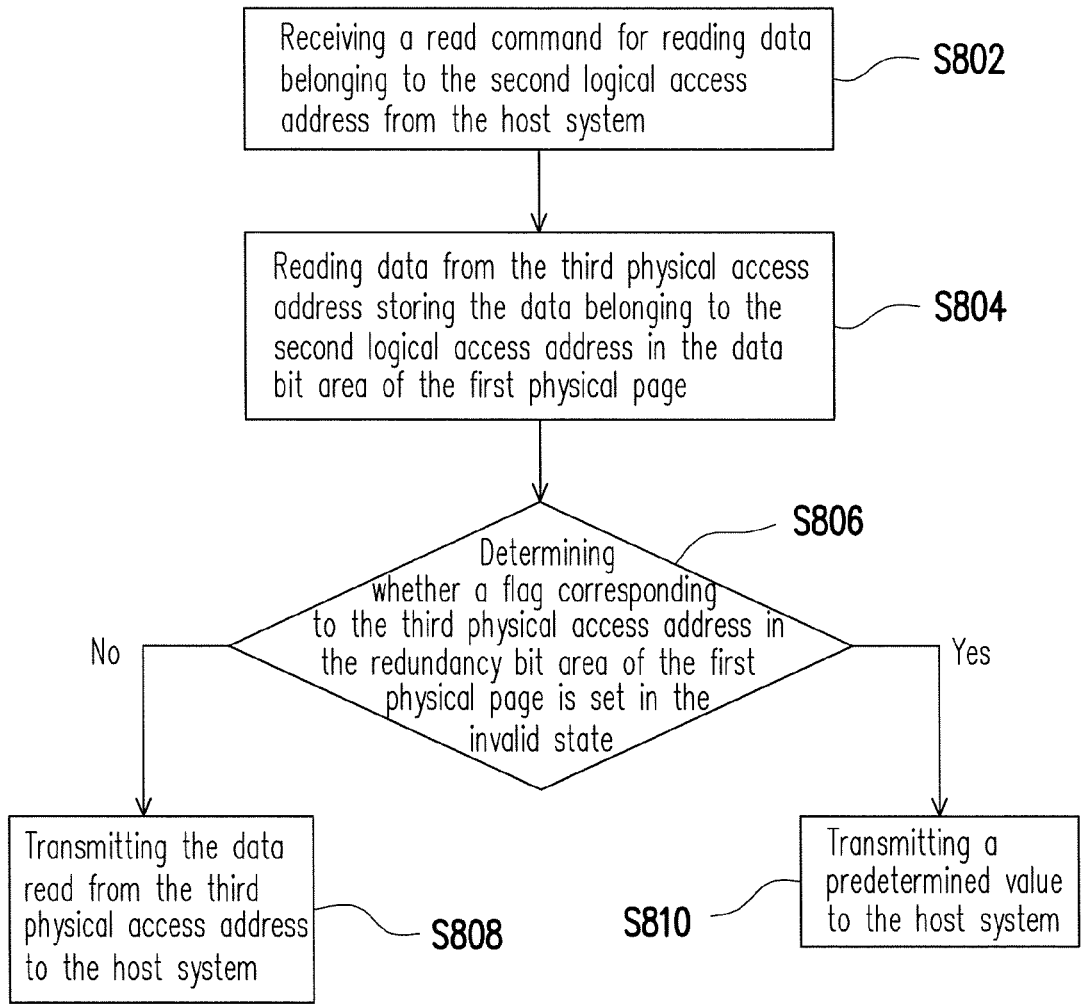
FIG. 8 is a flowchart illustrating a method of reading data according to the first exemplary embodiment of the present invention.
Figure 9:
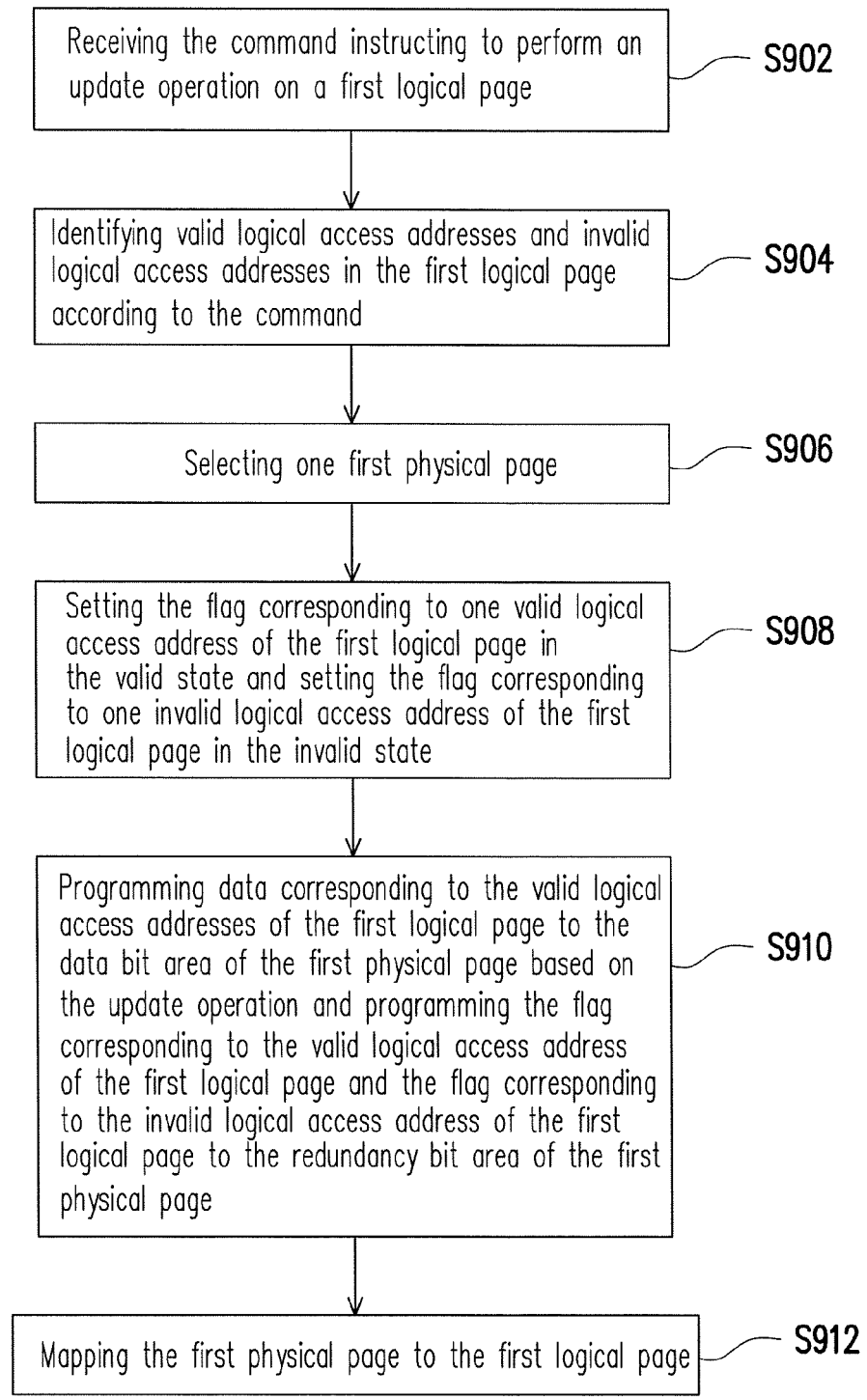
FIG. 9 is a flowchart illustrating a method of programming memory cells according to the first exemplary embodiment of the present invention.

FIG. 8 is a flowchart illustrating a method of reading data according to the first exemplary embodiment of the invention.

With reference to FIG. 8, in step S802, the memory management circuit 202 receives a read command instructing to read data belonging to the second logical access address (e.g. the logical access address 540(3)) of the first logical page (e.g. the logical page 502(0)) from the host system 1000.

In step S804, the memory management circuit 202 reads data from the third physical access address in the data bit area of the first physical page mapped to the first logical page, in which the data belonging to the second logical access address is stored in the third physical access address.

Then, in step S806, the memory management circuit 202 determines whether a flag corresponding to the third physical access address in the redundancy bit area of the first physical page is set in the invalid state. If the flag corresponding to the third physical access address is not set in the invalid state, in step S808, the memory management circuit 202 transmits the data read from the third physical access address to the host system. If the flag corresponding to the third physical access address is set in the invalid state, in step S810, the memory management circuit 202 transmits the predetermined value to the host system 1000.

It is to be mentioned that, when executing the read command, the flag recorded in the redundancy bit area is used for identifying whether the logical access address mapped to the physical access address is in the free state. Hence, when the host system 1000 performs an operation on the logical page, the memory management circuit 202 sets the corresponding flag according to the status of the logical access address in the logical page. In particular, when receiving the command instructing to perform an update operation (e.g. a write command) on one first logical page (step S902), the memory management circuit 202 identifies valid logical access addresses and invalid logical access addresses in the first logical page according to the command (step S904). Here, the invalid logical access addresses are referred to the logical access addresses where no data is written or the logical access addresses where stored data is already deleted. Otherwise, said the rest of logical access addresses which do not belong to the invalid logical access addresses are valid logical access addresses. Specially, afterwards, the memory management circuit 202 selects one first physical page (step S906) and sets the flag corresponding to one valid logical access address of the first logical page in the valid state and sets the flag corresponding to one invalid logical access address of the first logical page in the invalid state (step S908). Next, the memory management circuit 202 programs data corresponding to the valid logical access address of the first logical page to the data bit area of the first physical page based on the update operation and programs the flag corresponding to the valid logical access address of the first logical page and the flag corresponding to the invalid logical access address of the first logical page to the redundancy bit area of the first physical page (step S910). Here, no data will be written to the physical access address mapped to the invalid logical access address. Finally, the memory management circuit 202 maps the first physical page to the first logical page (step S912). Namely, the memory management circuit 202 programs the flag in the invalid state to the redundancy bit area of the physical page so as to avoid unnecessary write operations.

In order to describe how the flag corresponding to the invalid logical access address is operated, an example of operations to be performed when receiving a trim command and a write command will be illustrated in detail hereinafter.

When receiving a trim command, the memory management circuit 202 identifies a deleted logical access address as an invalid logical access address and sets a flag corresponding thereto in an invalid state according to the trim command. Particularly, under the file management mechanism of the host system 1000, the operation system manages data stored in the memory storage apparatus by using a file allocation table. Specially, in an example where a delete operation is performed on data by the operation system, the operation system rarely marks data in the logical access address to be deleted as invalid in the file allocation table to complete the delete operation for data rather than actually deleting the stored data. Then, when the operating system of the host system 1000 is about to write data in these logical access addresses, the operating system of the host system 1000 directly writes data thereto. Specially, in the present exemplary embodiment, the host system 1000 transmits the trim command to notify the memory storage apparatus 100 of information about which logical access addresses storing data therein is already deleted. Here, for the operation system of the host system 1000, the logical access addresses storing data therein that is already deleted are referred to as deleted logical access addresses. Namely, the update operation instructed by the trim command is to instruct which logical access addresses are referred to as deleted logical access addresses. Based on the above, when the host system 1000 is about to perform the read operation on the deleted logical access addresses, the host system 1000 receives the predetermined value belonging to a specific pattern (e.g. a bit stream composed of "0").

Figure 10:
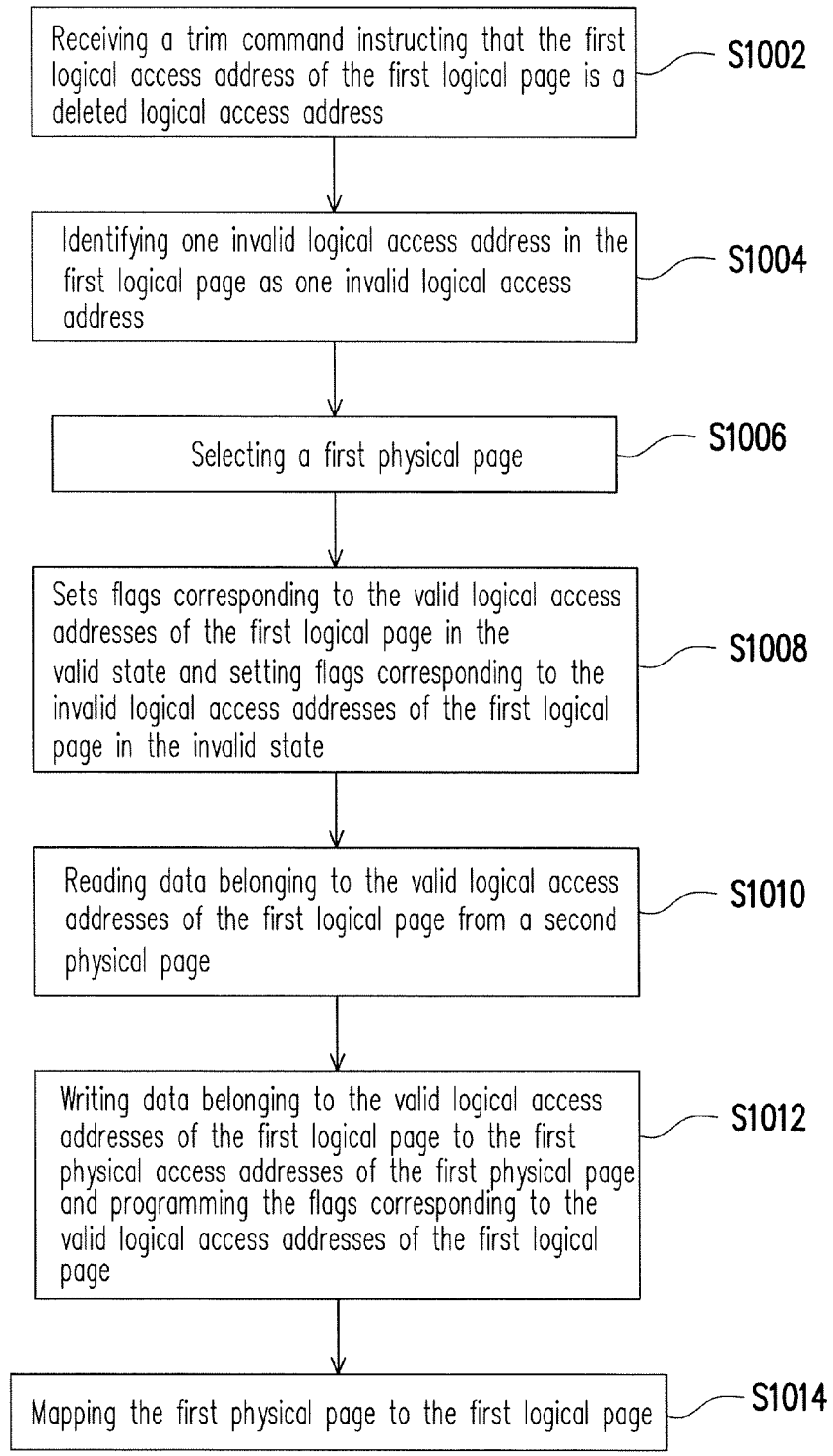
FIG. 10 is a flow chart of executing a trim command according to the first exemplary embodiment of the present invention.
Figure 11:
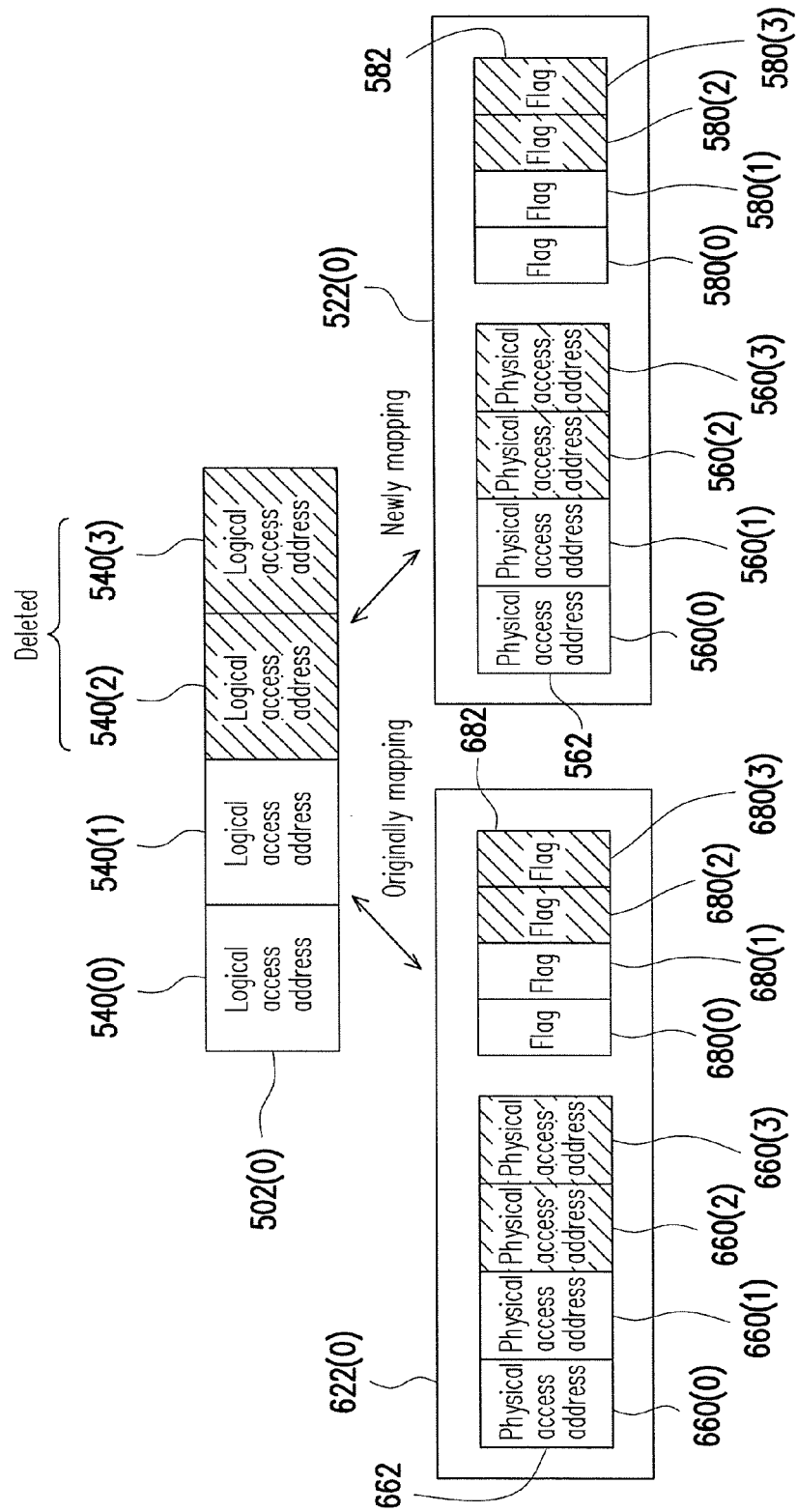
FIG. 11 is a diagram of executing a trim command according to the first exemplary embodiment of the present invention.

FIG. 10 is a flow chart of executing a trim command according to the first exemplary embodiment of the present invention, and FIG. 11 is a diagram of executing a trim command according to the first exemplary embodiment of the present invention. In the example illustrated in FIG. 11, the logical page 502(0) is originally mapped to the physical page 622(0), and the physical page 622(0) includes a data bit area 662 and a redundancy bit area 682. The data bit area 662 includes physical access addresses 660(0)~660(3), and the redundancy bit area 682 records flags 680(0)~680(3). That is, before the memory management circuit 202 receives the trim command, data belonging to the logical page 502(0) is originally stored in the physical page 622(0).

Referring to both FIG. 10 and FIG. 11, in step S1002, a trim command is received by the memory management circuit 202. An update operation instructed by the trim command is to instruct at least one first logical access address (e.g. the logical access addresses 540(2) and 540(3) as shown in FIG. 11) in the logical page (hereinafter as the first logical page, e.g. the logical page 502(0)) as at least one deleted logical access address.

In step S1004, the memory management circuit 202 identifies at least one deleted logical access address in the first logical page as at least one invalid logical access address and identifies the rest of logical access addresses (e.g. the logical access addresses 540(0) and 540(1) as shown in FIG. 11) as valid logical access addresses according to the trim command.

In step S1006, the memory management circuit 202 selects one physical page from the rewritable non-volatile memory module 106 (hereinafter as the first physical page, e.g. the physical page 522(0) as shown in FIG. 11).

In step S1008, the memory management circuit 202 sets flags corresponding to the valid logical access addresses of the first logical page in the valid state and sets flags corresponding to the invalid logical access addresses of the first logical page in the invalid state. For example, as shown in FIG. 11, flags corresponding to logical access addresses 540(0) and 540(1) are set in the valid state, and flags corresponding to logical access addresses 540(2) and 540(3) are set in the invalid state. Herein, each flag is indicated by one bit and temporarily stored in the buffer memory 252.

In step S1010, the memory management circuit 202 reads data belonging to the valid logical access addresses of the first logical page from a physical page (hereinafter as the second physical page, e.g. the physical page 622(0) as shown in FIG. 11) originally mapped to the first logical page. For example, as shown in FIG. 11, the memory management circuit 202 reads data belonging to logical access addresses 540(0) and 540(1) of the logical page 502(0) from physical access addresses 660(0) and 660(1) of the physical page 622(0).

Afterwards, in step S1012, the memory management circuit 202 writes data belonging to the valid logical access addresses of the first logical page to the first physical access addresses (for example, the physical access addresses 560(0) and 560(1) as shown in FIG. 11) of the first physical page and programs the flags corresponding to the valid logical access addresses of the first logical page and the flags corresponding to the invalid logical access addresses of the first logical page to the redundancy bit area of the first physical page.

For example, as shown in FIG. 11, the memory management circuit 202 writes data belonging to the valid logical access addresses 540(0) and 540(1) of the first logical page 502(0) to the physical access addresses 560(0) and 560(1) of the physical page 522(0). In other words, the memory management circuit 202 copies data stored in the physical access addresses 660(0) and 660(1) to the physical access addresses 560(0) and 560(1). In the mean time, when copying data stored in the physical access addresses 660(0) and 660(1) to the physical access addresses 560(0) and 560(1), the memory management circuit 202 programs four values of the four flags corresponding to the logical access addresses 540(0)~540(3) from the buffer memory 252 to the flags 580(0)~580(3) of the redundancy bit area 582. In particular, since the logical access addresses 540(2) and 540(3) belong to the invalid logical access addresses, and the logical access addresses 540(2) and 540(3) are respectively mapped to the physical access addresses 560(2) and 560(3) of the physical page 522(0), the flags 580(2) and 580(3) corresponding to the physical access addresses 560(2) and 560(3) are programmed to be in the invalid state so as to indicate the logical access addresses 540(2) and 540(3) as the invalid logical access addresses. Accordingly, the memory management circuit 202 does not require actually writing a predetermined data belonging to a specific pattern to the physical access addresses 560(2) and 560(3), and thereby, the time of writing data is shorten. On the other hand, since the logical access addresses 540(0) and 540(1) belong to the valid logical access addresses, and the logical access addresses 540(0) and 540(1) are mapped to the physical access addresses 560(0) and 560(1), the flags 580(0) and 580(1) respectively corresponding to the physical access addresses 560(0) and 560(1) are programmed to be in the valid state.

In step S1014, the memory management circuit 202 maps the first physical page (e.g. the physical page 522(0) as shown in FIG. 11) to the first logical page (e.g. the logical page 502(0) shown in FIG. 11).

It should be noted that the sequence for executing the steps illustrated in FIG. 10 is not limited to this. For example, step S1004 and step S1006 may be exchanged with each other, or, alternatively, step S1006, step S1008 and step S1010 may be exchanged with one another.

In an exemplary embodiment of the present invention, when receiving the write command, the memory management circuit 202 identifies a state of an un-updated logical access address according to the write command. Specially, when the state of the un-updated logical access address is free (i.e. the unwritten logical access address or the deleted logical access address), the memory management circuit 202 identifies the un-updated logical access address as one invalid logical access address and set its corresponding flag as in the invalid state. For instance, in an exemplary embodiment of the present invention, the memory management circuit 202 creates a free logical address table for recording the logical access addresses in the free state. For example, the free logical address table is stored in the system area 406, and when the memory storage apparatus 100 is activated, the free logical address table is loaded to the buffer memory 252 for being updated.

Figure 12:
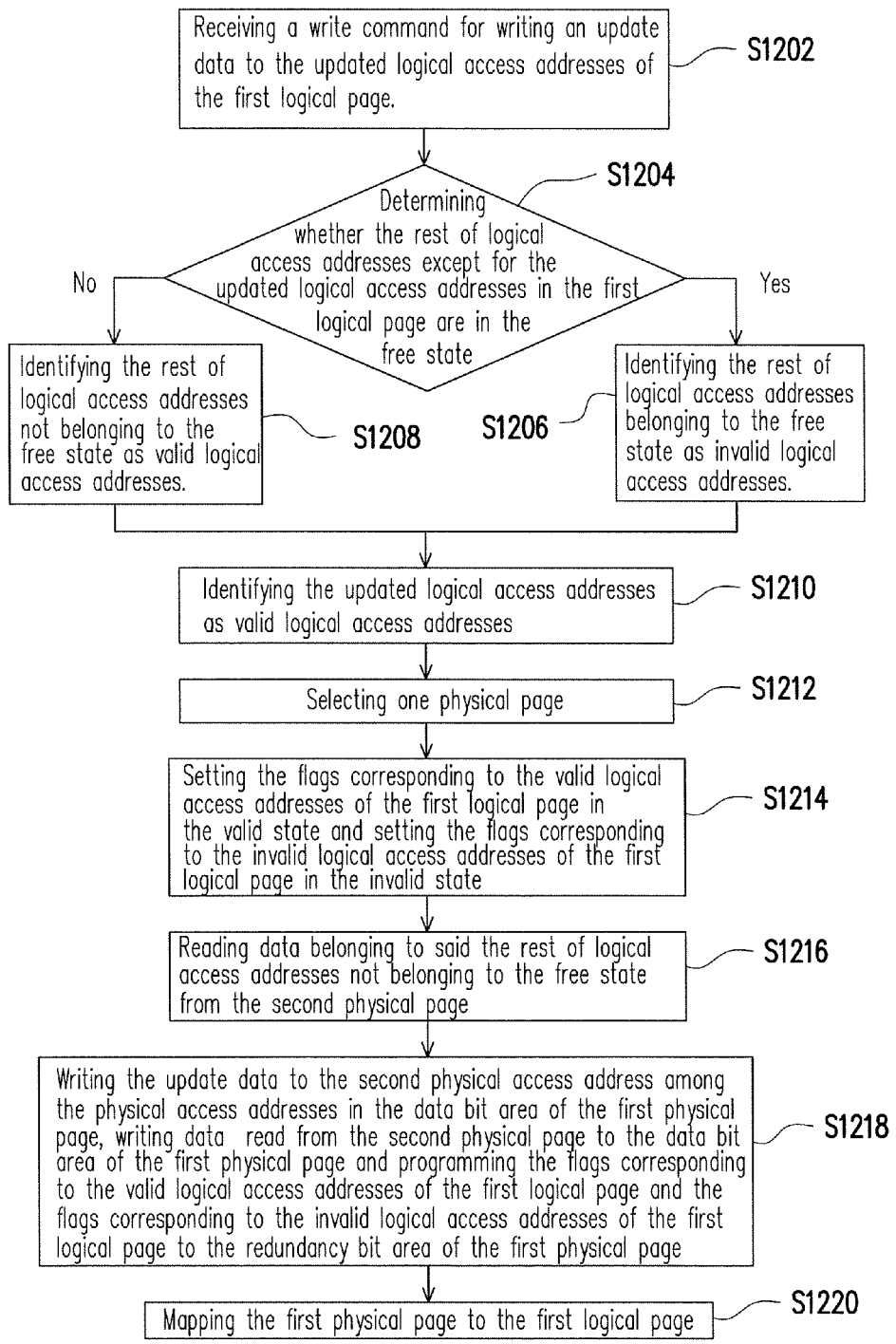
FIG. 12 is a flowchart of executing a write command according to the first exemplary embodiment of the present invention.
Figure 13:
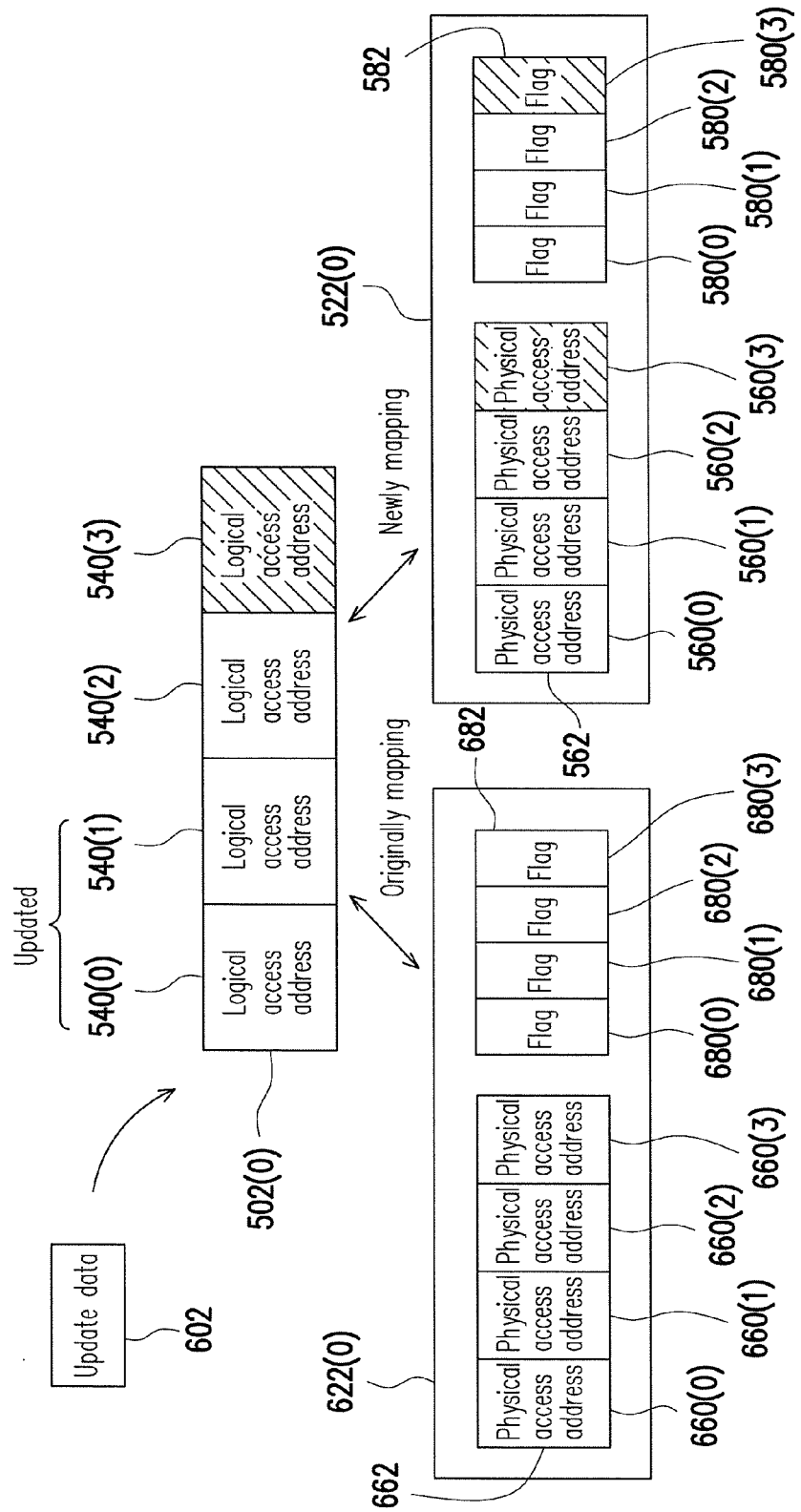
FIG. 13 is a diagram of executing a write command according to the first exemplary embodiment of the present invention.

FIG. 12 is a flowchart of executing a write command according to the first exemplary embodiment of the invention, and FIG. 13 is a diagram of executing a write command according to the first exemplary embodiment of the invention. Given that in the example as illustrated in FIG. 12, data belonging to the logical access addresses 540(0), 540(1) and 540(2) of the logical page 502(0) is stored in the physical access addresses 660(0), 660(1) and 660(2) of the physical page 622(0), and the logical access address 540(3) of the logical page 502(0) is in the free state.

Referring to both FIG. 12 and FIG. 13, in step S1202, the memory management circuit 202 is configured to receive a write command from the host system 1000. The update operation instructed by the write command is to write an update data to the updated logical access addresses of the first logical page. At the same time when receiving the write command, the memory management circuit 202 identifies the physical page originally mapped to the first logical page. For example, as shown in FIG. 13, the update operation corresponding to the write command is configured for instructing to write the update data 602 to the logical access addresses 540(0) and 540(1) (i.e. the updated logical access addresses) of the first logical page. The first logical page 502(0) is originally mapped to the physical page 622(0) (i.e. the second physical page).

In step S1204, the memory management circuit 202 determines whether the rest of logical access addresses (i.e. the logical access addresses 540(2) and 540(3)) except for the updated logical access addresses in the first logical page are in the free state. For example, the memory management circuit 202 may identify the logical access addresses in the free state according to the free logical address table.

If the rest of logical access addresses are in the free state, then in S1206, the memory management circuit 202 identifies the rest of logical access addresses belonging to the free state as invalid logical access addresses. For example, as shown in FIG. 13, the memory management circuit 202 identifies the logical access address 540(3) as the invalid logical access address.

If the rest of logical access addresses are not in the free state, then in step S1208, the memory management circuit 202 identifies the rest of logical access addresses (e.g. the logical access address 540(2) shown in FIG. 13) not belonging to the free state as valid logical access address.

In step S1210, the memory management circuit 202 identifies the updated logical access addresses (e.g. the logical access addresses 540(0) and 540(1) as shown in FIG. 13) as the valid logical access addresses. Namely, as shown in FIG. 13, after steps S1204, S1206, S1208 and S1210 are performed, the logical access addresses 540(0)~540(2) are identified as the valid logical access addresses, and the logical access address 540(3) is identified as the invalid logical access address. However, if should be noted that step S1210 may be performed before step S1204, and the present invention is not intent to limit the sequence for performing step S1204 and step S1210.

Then, in step S1212, the memory management circuit 202 selects one physical page of one physical block from the rewritable non-volatile memory module 106 (hereinafter as the first physical page, e.g. the physical page 522(0)).

In step S1214, the memory management circuit 202 sets the flags corresponding to the valid logical access addresses of the first logical page in the valid state and sets the flags corresponding to the invalid logical access addresses of the first logical page in the invalid state. For example, as shown in FIG. 13, the flags corresponding to the valid logical access addresses 540(0)~540(2) are set in the valid state, and the flag corresponding to the logical access address 540(3) is set in the invalid state. Each of the flags is indicated by one bit and temporarily stored in the buffer memory 252.

In step S1216, the memory management circuit 202 reads data belonging to said the rest of logical access addresses not belonging to the free state from the second physical page. For example, as shown in FIG. 13, the memory management circuit 202 reads data belonging to the logical access address 540(2). To be more particular, since the logical access address 540(2) is originally mapped to the physical access address 660(2), the memory management circuit 202 reads data stored in the physical access address 660(2) from the physical page 622(0).

In step S1218, the memory management circuit 202 writes the update data to at least one physical access address (hereinafter as the second physical access address) among the physical access addresses in the data bit area of the first physical page, writes data read from the second physical page to the data bit area of the first physical page and programs the flags corresponding to the valid logical access addresses of the first logical page and the flags corresponding to the invalid logical access addresses of the first logical page to the redundancy bit area of the first physical page.

Finally, in step S1220, the memory management circuit 202 maps the first physical page to the first logical page.

For example, as shown in FIG. 13, the memory management circuit 202 writes the update data 602 to the physical access addresses 560(0) and 560(1) (i.e. the second physical access addresses) of the physical page 522(0). Besides, the memory management circuit 202 writes data read from the physical access address 660(2) to the physical access address 560(2). In addition, since the logical access address 540(3) is the invalid logical access address, the memory management circuit 202 does not write data to the physical access address 560(3) of the physical page 522(0). In the meantime, when programming data to the data bit area 562, the memory management circuit 202 programs four values of four flags corresponding to the logical access addresses to the flags 580(0)~580(3) of the redundancy bit area 582 from the buffer memory. To be specific, since the logical access addresses 540(0)~540(2) are the valid logical access addresses, and the logical access addresses 540(0)~540(2) are newly mapped to the physical access addresses 560(0)~560(2), the flags 580(0)~580(2) corresponding to the physical access addresses 560(0)~560(2) are programmed to be in the valid state. On the other hand, since the logical access address 540(3) is the invalid logical access address, and the logical access address is newly mapped to the physical access address 560(3), the flag 580(3) corresponding to the physical access address 560(3) is programmed to be in the invalid state. At last, the first physical page 522(0) is mapped to the first logical page 622(0).

[Second Exemplary Embodiment]

The second exemplary embodiment is similar to the first exemplary embodiment and differs from the first exemplary embodiment in the memory controller 104 encrypting data before data is written to the rewritable non-volatile memory module 106 and decrypting data when data is read from the rewritable non-volatile memory 106.

Figure 14:
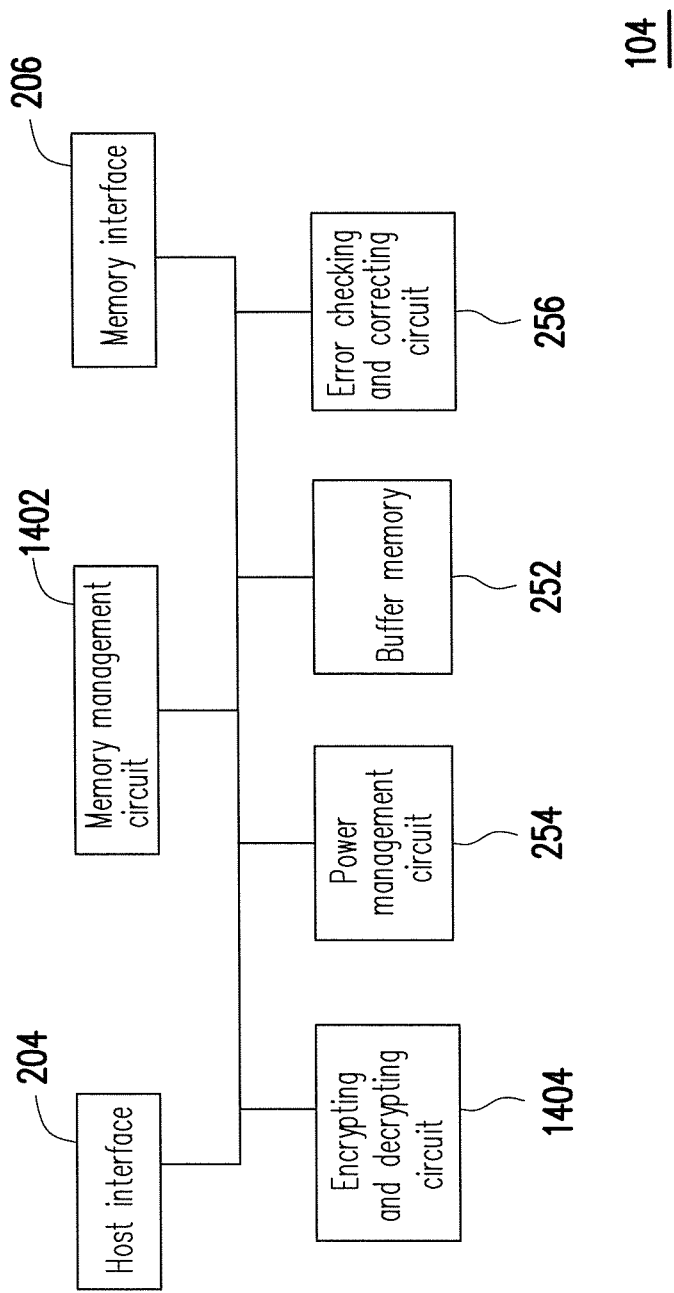
FIG. 14 is a schematic block diagram illustrating a memory controller according to a second exemplary embodiment of the present invention.

FIG. 14 is a schematic block diagram illustrating a memory controller according to the second exemplary embodiment of the invention.

Referring to FIG. 14, a memory controller 104 includes the host interface 204, a memory management circuit 1402, the memory interface 206, an encrypting and decrypting circuit 1404, the power management circuit 254, the buffer memory 252 and the error and correction circuit 256. Herein, the functions and operations of the host interface 204, the memory interface 206, the power management circuit 254, the buffer memory 252 and the error checking and correction circuit 256 have been described in the first exemplary embodiment and will not be repeated hereinafter.

The memory management circuit 1402 is substantially the same as the memory management circuit 202 described in the first exemplary embodiment, and differs therefore in the memory management circuit 1402 encrypting data to be stored in the rewritable non-volatile memory module 106 and decrypting data read from the rewritable non-volatile memory module 106 by the encrypting and decrypting circuit 1404. In the present exemplary embodiment, the encrypting and decrypting circuit 1404 complies with the advanced encryption standard (AES). However, in other embodiments, the encrypting and decrypting circuit 1404 may also comply with the data encryption standard (DES), the present invention is not limited thereto.

It is to be mentioned that in the present exemplary embodiment, the memory controller 104 can avoid unnecessary encrypting and decrypting operations based on the flags in the redundancy bit area so as to increase the speed for writing and reading data.

Figure 15:
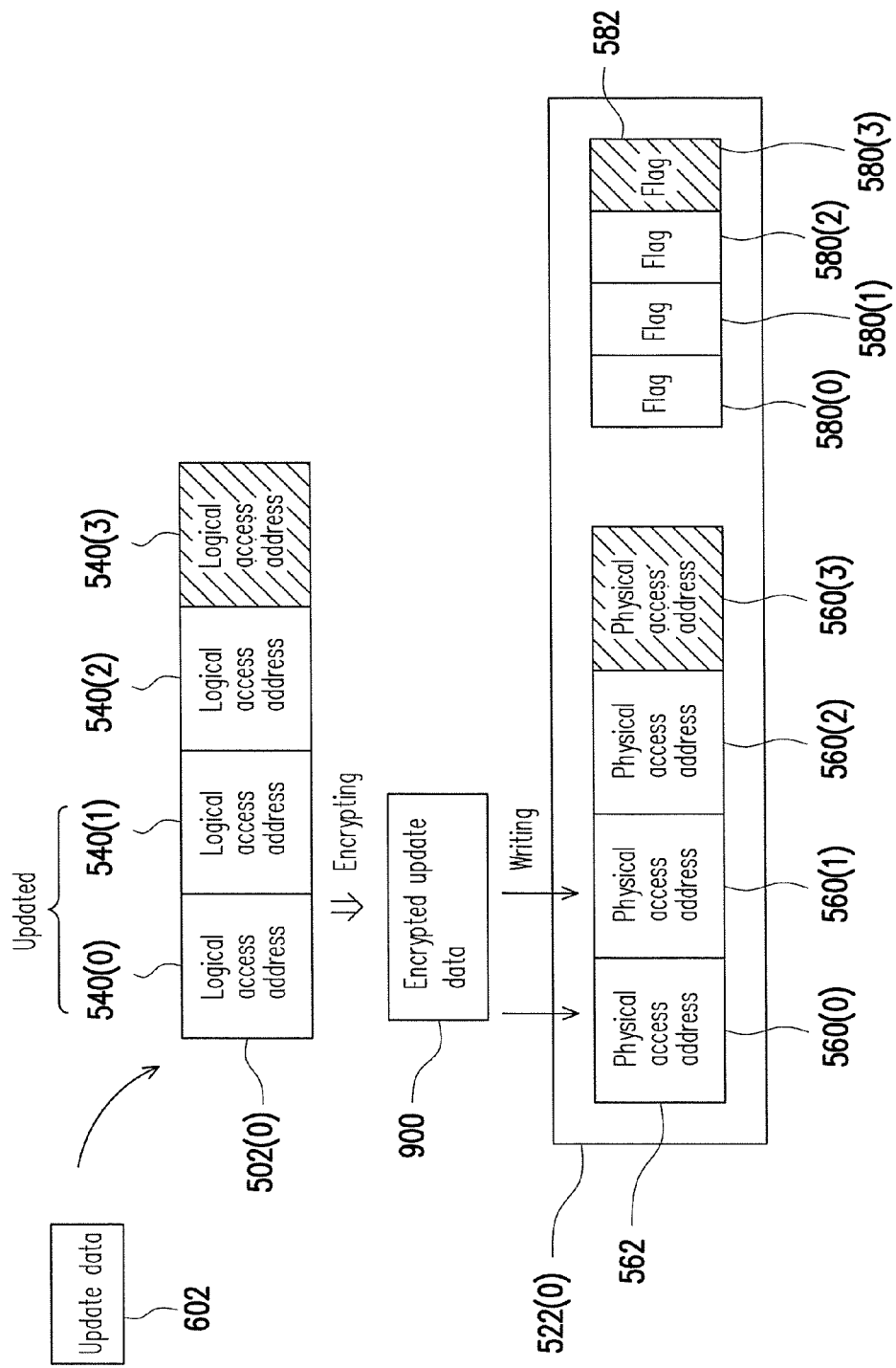
FIG. 15 is a diagram of encrypting and writing update data according to the second exemplary embodiment of the present invention.

FIG. 15 is a diagram of encrypting and writing update data according to the second exemplary embodiment of the present invention.

Referring to FIG. 15, when the host system 1000 is about to update data belonging to the logical page 502(0) according to the update data 602, the host system 1000 transmits the write command and the update data 602 to the memory management circuit 1402. For example, the update data 602 is used for updating data belonging to the logical access addresses 540(0) and 540(1). Besides, in the present exemplary embodiment, the logical access address 540(3) is in the free state and will be identified as the invalid logical access address by the memory management circuit 1402. However, before the update data 602 is written to the physical page 522(0), the memory management circuit 1402 transmits the update data 602 to the encrypting and decrypting circuit 1404, and the encrypting and decrypting circuit 1404 encrypts the update data 602 to generate encrypted update data 900. Afterwards, the memory management circuit 1402 writes the encrypted update data 900 to the physical access addresses 560(0) and 560(1) (i.e. the second physical access address). Besides, data belonging to the logical access address 540(2) is copied from the physical page originally mapped to logical page 502(0) to the physical access address 560(2). Additionally, in the meantime when data is programmed to the physical page 522(0), the memory management circuit 1402 programs four flags corresponding to the logical access addresses 540(0)~540(3) to the redundancy bit area 582 as the 580(0)~580(3). In particular, the flags 580(0)~580(2) are programmed to be in the valid state, and the flag 580(3) is programmed to be in the invalid state. Namely, the memory management circuit 1402 does not program data to the physical access address 560(3) so as to save the time required for programming to the physical page.

Figure 16:
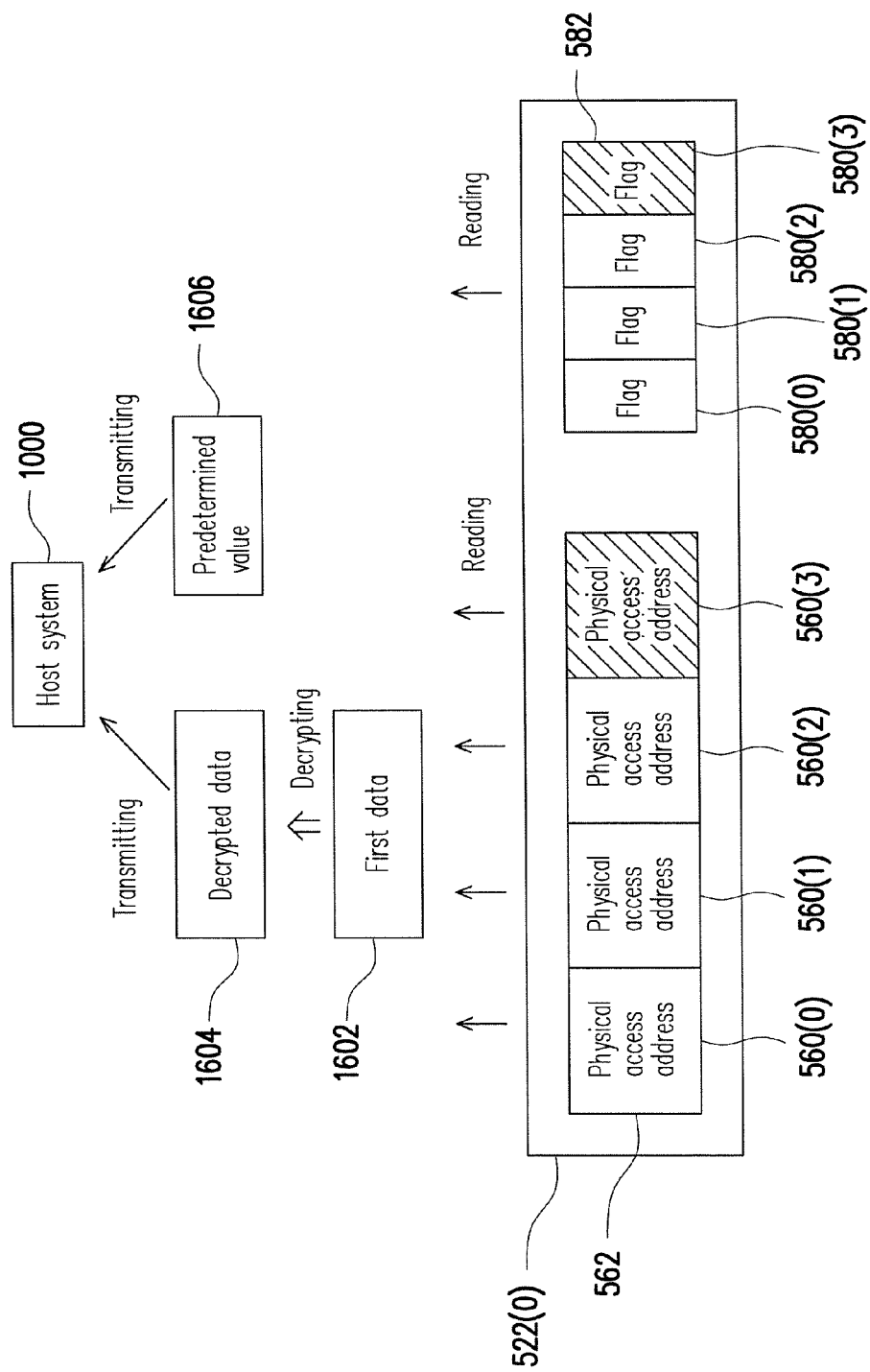
FIG. 16 is a diagram of reading and decrypting update data according to the second exemplary embodiment of the present invention.

FIG. 16 is a diagram of reading and decrypting data according to the second exemplary embodiment of the invention.

Referring to FIG. 16, when the host system 1000 receives a command instructing to read the logical access address 502(0) mapped to the physical page 522(0), the memory management circuit 1402 reads data from the physical page 522(0). Specially, the memory management circuit 1402 determines whether to transmit data to the encrypting and decrypting circuit 1404 for decrypting according to the flags 580(0)~580(3) in the redundancy bit area 582. In particular, when the memory management circuit 1402 reads the stored data from the physical access addresses 560(0)~560(2), the memory management circuit 1402 reads the flags 580(0)~580(2) in the redundancy bit area 582 and transmits first data 1602 read based on the flags 580(0)~580(2) which are in the valid state to the encrypting and decrypting circuit 1404 for decrypting the first data 1602 to generate a decrypted data 1604. Further, when the memory management circuit 1402 reads the stored data from the physical access address 560(3), the memory management circuit 1402 reads the flag 580(3) in the redundancy bit area 582 and transmits a predetermined value 1606 to the host system 1000 according to the flag 580(3) which is in the invalid state.

In view of the foregoing, the memory storage apparatus, the memory controller and the method of programming memory cells disclosed in the exemplary embodiments of the present invention utilizes programming the flag corresponding to the invalid logical access address in the redundancy bit area of the physical page to be in invalid state and thereby, the time required for programming data to the physical page is significantly shortened. In addition, the memory storage apparatus, the memory controller and the method of reading data disclosed in the exemplary embodiments of the present invention utilizes identifying the invalid logical access address according to the flag in the redundancy bit area of the physical page so as to rapidly transmit the predetermined data to the host system.

Although the invention has been described with reference to the above embodiments, it will be apparent to one of ordinary skill in the art that modifications to the described embodiments may be made without departing from the spirit of the invention. Therefore, the protecting range of the invention falls in the appended claims.

What is claimed is:

1. A method of programming memory cells for a rewritable non-volatile memory module, wherein the rewritable non-volatile memory module has a plurality of physical blocks, each of the physical blocks has a plurality of physical pages, each of the plurality of physical pages has a data bit area and a redundancy bit area, the data bit area has a plurality of physical access addresses and the redundancy bit area respectively records a plurality of flags corresponding to the plurality of physical access addresses, a plurality of logical pages are configured to map to a portion of the plurality of the physical pages, and each of the plurality of logical pages has a plurality of logical access addresses, the method of programming memory cells comprising:

receiving a command, wherein the command instructs to perform an update operation on a first logical page among the plurality of logical pages;

identifying at least one invalid logical access address and at least one valid logical access among the plurality of logical access addresses of the first logical page according to the command;

selecting a first physical page from the plurality of physical pages;

setting at least one flag corresponding to the at least one valid logical access address of the first logical page in a valid state and setting at least one flag corresponding to the at least one invalid logical access address of the first logical page in an invalid state;

programming data corresponding to the at least one valid logical access address of the first logical page to the data bit area of the first physical page based on the update operation and programming the at least one flag corresponding to the at least one valid logical access address of the first logical page and the at least one flag corresponding to the at least one invalid logical access address of the first logical page to the redundancy bit area of the first physical page, wherein other data storing in the data bit area of the first physical page are invalid except for data corresponding to the at least one valid logical access address of the first logical page; and mapping the first physical page to the first logical page.

2. The method of programming memory cells according to claim 1, wherein the first logical page is originally mapped to a second physical page, the second physical page stores data belonging to the plurality of logical access addresses of the first logical page, the command is a trim command, and the update operation is performed to instruct that at least one first logical access address among the plurality of logical access addresses of the first logical page is a deleted logical access address,
  wherein the step of identifying the at least one invalid logical access address and the at least one valid logical access address among the plurality of logical access addresses of the first logical page comprises:
  identifying the at least one first logical access address of the first logical page as the at least one invalid logical access address according to the trim command; and
  wherein the step of programming data corresponding to the at least one valid logical access address of the first logical page to the data bit area of the first physical page based on the update operation further comprises:
  reading data belonging to the at least one valid logical access address of the first logical page from the second physical page; and
  writing the data belonging to the at least one valid logical access address of the first logical page to at least one first physical access address among the plurality of physical access addresses in the data bit area of the first physical page, wherein the at least one flag corresponding to the at least one valid logical access address of the first logical page corresponds to the at least one first physical access address.

3. The method of programming memory cells according to claim 1, further comprising:
  creating a free logical address table to record a logical access address belonging to a free state, wherein the logical access address belonging to the free state is a logical access address where no data is written or a logical access address where stored data is deleted.

4. The method of programming memory cells according to claim 1, wherein the command is a write command, and the update operation is performed to instruct to write an update data to at least one updated logical access address among the plurality of logical access addresses of the first logical page,
  wherein the step of identifying the at least one invalid logical access address and the at least one valid logical access address among the plurality of logical access addresses of the first logical page comprises:
  determining whether at least one of the rest of logical access addresses except for the at least one updated logical access address among the plurality of logical access addresses of the first logical page is an unwritten logical access address or a deleted logical access address; and
  if the at least one of the rest of logical access addresses is the unwritten logical access address or the deleted logical access address, identifying the at least one of the rest of logical access addresses as the at least one invalid logical access address.

5. The method of programming memory cells according to claim 4, wherein the step of programming the data corresponding to the at least one valid logical access address of the first logical page to the data bit area of the first physical page based on the update operation comprises:
  writing the update data to at least one second physical access address among the plurality of physical access addresses in the data bit area of the first physical page, wherein the at least one flag corresponding to the at least one valid logical access address of the first logical page corresponds to the at least one second physical access address.

6. The method of programming memory cells according to claim 4, further comprising encrypting the update data to generate an encrypted update data,
  wherein the step of programming the data corresponding to the at least one valid logical access address of the first logical page to the data bit area of the first physical page based on the update operation further comprises:
  writing the encrypted update data to the at least one second physical access address among the plurality of physical access addresses in the data bit area of the first physical page, wherein the at least one flag corresponding to the at least one valid logical access address of the first logical page corresponds to the at least one second physical access address.

7. A memory storage apparatus, comprising:
  a connector, configured to couple to a host system;
  a rewritable non-volatile memory module, having a plurality of physical blocks, wherein each of the physical blocks has a plurality of physical pages, wherein each of the plurality of physical pages has a data bit area and a redundancy bit area, the data bit area has a plurality of physical access addresses and the redundancy bit area respectively records a plurality of flags corresponding to the plurality of physical access addresses, a plurality of logical pages are configured to map to a portion of the plurality of the physical pages, and each of the plurality of logical pages has a plurality of logical access addresses; and
  a memory controller, coupled to the connector and the rewritable non-volatile memory module,
  wherein the memory controller is configured to receive a command, and the command instructs to perform an update operation on a first logical page among the plurality of logical pages;
  wherein the memory controller is further configured to identify at least one invalid logical access address and at least one valid logical access address among the plurality of logical access addresses of the first logical page,
  wherein the memory controller is further configured to select a first physical page from the plurality of physical pages,
  wherein the memory controller is further configured to set at least one flag corresponding to the at least one valid logical access address of the first logical page in a valid state and set at least one flag corresponding to the at least one invalid logical access address of the first logical page in an invalid state,
  wherein the memory controller is further configured to program data corresponding to the at least one valid logical access address of the first logical page to the data bit area of the first physical page and program the at least one flag corresponding to the at least one valid logical access address of the first logical page and the at least one flag corresponding to the at least one invalid logical access address of the first logical page to the redundancy bit area of the first physical page, and
  wherein the memory controller is further configured to map the first physical page to the first logical page, wherein other data storing in the data bit area of the first physical page are invalid except for data corresponding to the at least one valid logical access address of the first logical page.

8. The memory storage apparatus according to claim 7, wherein the first logical page is originally mapped to a second physical page, the second physical page stores data belonging to the plurality of logical access addresses of the first logical page, the command is a trim command, and the update operation is performed to instruct that at least one first logical access address among the plurality of logical access addresses of the first logical page is a deleted logical access address,
- wherein the memory controller is further configured to identify at least one first logical access address of the first page as the at least one invalid logical access address, and wherein the memory controller is further configured to read data belonging to the at least one valid logical access address of the first logical page from the second physical page,
- wherein the memory controller is further configured to write the data belonging to the at least one valid logical access address of the first logical page to at least one first physical access address among the plurality of physical access addresses in the data bit area of the first physical page, wherein the at least one flag corresponding to the at least one valid logical access address of the first logical page corresponds to the at least one first physical access address.

9. The memory storage apparatus according to claim 7, wherein the memory controller is configured to create a free logical address table to record a logical access address belonging to a free state, wherein the logical access address belonging to the free state is a logical access address where no data is written or a logical access address where stored data is deleted.

10. The memory storage apparatus according to claim 7, wherein the command is a write command, and the update operation is performed to instruct to write an update data to at least one updated logical access address among the plurality of logical access addresses of the first logical page,
- wherein the memory controller is further configured to determine whether at least one of the rest of logical access addresses except for the at least one updated logical access address among the plurality of logical access addresses of the first logical page is an unwritten logical access address or a deleted logical access address; and
- if the at least one of the rest of logical access addresses is the unwritten logical access address or the deleted logical access address, the memory controller identifies the at least one of the rest of logical access addresses as the at least one invalid logical access address.

11. The memory storage apparatus according to claim 10, wherein the memory controller is further configured to write the update data to at least one second physical access address among the plurality of physical access addresses in the data bit area of the first physical page, wherein the at least one flag corresponding to the at least one valid logical access address of the first logical page corresponds to the at least one second physical access address.

12. The memory storage apparatus according to claim 10, wherein the memory controller is further configured to encrypt the update data to generate an encrypted update data,
- wherein the memory controller is further configured to write the encrypted update data to the at least one second physical access address among the plurality of physical access addresses in the data bit area of the first physical page, wherein the at least one flag corresponding to the at least one valid logical access address of the first logical page corresponds to the at least one second physical access address.

13. The memory storage apparatus according to claim 7, wherein the memory controller is further configured to receive a read command from the host system, wherein the read command instructs to read data belonging to a second logical access address of the first logical page,
- wherein the memory controller is further configured to read data from a third physical access address in the data bit area of the first physical page, wherein the data belonging to the second logical access address is stored in the third physical access address in the data bit area of the first physical page,
- wherein the memory controller is further configured to determine whether a flag corresponding to the third physical access address in the redundancy bit area of the first physical page is set in the invalid state,
- wherein if the flag corresponding to the third physical access address in the redundancy bit area of the first physical page is not set in the invalid state, the memory controller transmits the data read from the third physical access address in the data bit area of the first physical page to the host system, and
- wherein if the flag corresponding to the third physical access address in the redundancy bit area of the first physical page is set in the invalid state, the memory controller transmits a predetermined value to the host system.

14. The memory storage apparatus as recited in claim 13, wherein the memory controller is further configured to decrypt the data read from the third physical access address in the data bit area of the first physical page to obtain a decrypted data and transmitting the decrypted data to the host system in response to the read command.

15. A memory controller for controlling a rewritable non-volatile memory module, wherein the rewritable non-volatile memory module has a plurality of physical blocks, each of the physical blocks has a plurality of physical pages, each of the plurality of physical pages has a data bit area and a redundancy bit area, the data bit area has a plurality of physical access addresses and the redundancy bit area respectively records a plurality of flags corresponding to the plurality of physical access addresses, a plurality of logical pages are configured to map to a portion of the plurality of the physical pages, and each of the plurality of logical pages has a plurality of logical access addresses, the memory controller comprising:
- a host interface, configured to couple to a host system;
- a memory interface, configured to couple to the rewritable non-volatile memory module; and
- a memory management circuit, coupled to the host interface and the memory interface and is configured to receive a command from the host system, wherein the command instructs to perform an update operation on a first logical page among the plurality of logical pages,
- wherein the memory management circuit is further configured to identify at least one invalid logical access address and at least one valid logical access address among the plurality of logical access addresses of the first logical page according to the command,
- wherein the memory management circuit is further configured to select a first physical page from the plurality of physical pages,
- wherein the memory management circuit is further configured to set at least one flag corresponding to the at least one valid logical access address of the first logical page in a valid state and sets at least one flag corresponding to the at least one invalid logical access address of the first logical page in an invalid state,
- wherein the memory management circuit is further configured to program data corresponding to the at least one valid logical access address of the first logical page to the data bit area of the first physical page and programs the at least one flag corresponding to the at least one valid logical access address of the first logical page and the at least one flag corresponding to the at least one invalid logical access address of the first logical page to the redundancy bit area of the first physical page, and wherein the memory management circuit is further configured to map the first physical page to the first logical page, wherein other data storing in the data bit area of the first physical page are invalid except for data corresponding to the at least one valid logical access address of the first logical page.

16. The memory controller according to claim 15, wherein the first logical page is originally mapped to a second physical page, the second physical page stores data belonging to the plurality of logical access addresses of the first logical page, the command is a trim command, and the update operation is performed to instruct that at least one first logical access address among the plurality of logical access addresses of the first logical page as a deleted logical access address, wherein the memory management circuit is further configured to identify the at least one first logical access address of the first logical page as the at least one invalid logical access address according to the trim command, wherein the memory management circuit is further configured to read data belonging to the at least one valid logical access address of the first logical page from the second physical page, and wherein the memory management circuit is further configured to write the data belonging to the at least one valid logical access address of the first logical page to at least one first physical access address among the plurality of physical access addresses in the data bit area of the first physical page, wherein the at least one flag corresponding to the at least one valid logical access address of the first logical page corresponds to the at least one first physical access address.

17. The memory controller according to claim 15, wherein the memory management circuit is further configured to create a free logical address table to record a logical access address belonging to a free state, wherein the logical access address belonging to the free state is a logical access address where no data is written or a logical access address where stored data is deleted.

18. The memory controller according to claim 15, wherein the command is a write command, and the update operation is performed to instruct to write an update data in at least one updated logical access address among the plurality of logical access addresses of the first logical page, wherein the memory management circuit is further configured to determine whether at least one of the rest of logical access addresses except for the at least one updated logical access address among the plurality of logical access addresses of the first logical page is an unwritten logical access address or a deleted logical access address, and if the at least one of the rest of logical access addresses is the unwritten logical access address or the deleted logical access address, the memory management circuit identifies the at least one of the rest of logical access addresses as the at least one invalid logical access address.

19. The memory controller according to claim 18, wherein the memory management circuit is further configured to write the update data to at least one second physical access address among the plurality of physical access addresses in the data bit area of the first physical page, wherein the at least one flag corresponding to the at least one valid logical access address of the first logical page corresponds to the at least one second physical access address.

20. The memory controller according to claim 18, further comprising a encrypting and decrypting circuit, wherein the encrypting and decrypting circuit is configured to encrypt the update data to generate an encrypted update data, wherein the memory management circuit is further configured to write the encrypted update data to the at least one second physical access address among the plurality of physical access addresses in the data bit area of the first physical page, wherein the at least one flag corresponding to the at least one valid logical access address of the first logical page corresponds to the at least one second physical access address.

21. The memory controller according to claim 15, wherein the memory management circuit is further configured to receive a read command from the host system, wherein the read command instructs to read data belonging to a second logical access address, wherein the memory management circuit is further configured to read data from a third physical access address in the data bit area of the first physical page, wherein the data belonging to the second logical access address is stored in the third physical access address in the data bit area of the first physical page, wherein the memory management circuit is further configured to determine whether a flag corresponding to the third physical access address in the redundancy bit area of the first physical page is set in the invalid state, wherein if the flag corresponding to the third physical access address in the redundancy bit area of the first physical page is not set in the invalid state, the memory management circuit transmits the data read from the third physical access address in the data bit area of the first physical page to the host system, wherein if the flag corresponding to the third physical access address in the redundancy bit area of the first physical page is set in the invalid state, the memory management circuit transmits a predetermined value to the host system.

22. The memory controller according to claim 21, further comprising an encrypting and decrypting circuit, wherein the encrypting and decrypting circuit is configured to decrypt the data read from the third physical access address in the data bit area of the first physical page to obtain a decrypted data, and the memory management circuit is further configured to transmit the decrypted data to the host system in response to the read command.

* * * * *